(12) United States Patent
Henderson et al.

(10) Patent No.: US 12,481,065 B2
(45) Date of Patent: Nov. 25, 2025

(54) EVENT DRIVEN SHARED MEMORY PIXEL

(71) Applicant: Sense Photonics, Inc., Durham, NC (US)

(72) Inventors: Robert Henderson, Edinburgh (GB); Hod Finkelstein, Berkeley, CA (US)

(73) Assignee: Sense Photonics, Inc., Durham, NC (US)

( * ) Notice: Subject to any disclaimer, the term of this patent is extended or adjusted under 35 U.S.C. 154(b) by 973 days.

(21) Appl. No.: 17/607,056

(22) PCT Filed: May 1, 2020

(86) PCT No.: PCT/US2020/030920
§ 371 (c)(1),
(2) Date: Oct. 28, 2021

(87) PCT Pub. No.: WO2020/223589
PCT Pub. Date: Nov. 5, 2020

(65) Prior Publication Data
US 2022/0206158 A1    Jun. 30, 2022

Related U.S. Application Data

(60) Provisional application No. 62/841,315, filed on May 1, 2019.

(51) Int. Cl.
*G01S 17/894* (2020.01)
*G01S 7/4863* (2020.01)
(Continued)

(52) U.S. Cl.
CPC .......... *G01S 17/894* (2020.01); *G01S 7/4863* (2013.01); *G01S 7/4865* (2013.01); *G01S 7/4873* (2013.01);
(Continued)

(58) Field of Classification Search
CPC .... G01S 17/894; G01S 7/4863; G01S 7/4873; G01S 7/4914; G01S 7/493; G01S 7/4815;
(Continued)

(56) References Cited

U.S. PATENT DOCUMENTS

| 4,989,138 A | 1/1991 | Radochonski |
| 10,317,529 B2 | 6/2019 | Shu et al. |

(Continued)

FOREIGN PATENT DOCUMENTS

| CN | 108291961 A | 7/2018 |
| CN | 108307180 A | 7/2018 |

(Continued)

OTHER PUBLICATIONS

EP20798862.7, "Office Action", Oct. 23, 2024, 10 pages.
(Continued)

*Primary Examiner* — Jennifer D Bennett
*Assistant Examiner* — Erin R Garber
(74) *Attorney, Agent, or Firm* — Kilpatrick Townsend & Stockton LLP

(57) ABSTRACT

A Time of Flight (TOF) system includes an incrementing circuit and a plurality of pixels. Each pixel includes a plurality of detectors configured to output respective detection signals responsive to detection of a plurality of photons incident thereon and a shared memory configured to store a respective count of the photons incident on each of the plurality of detectors. The incrementing circuit is configured to update the respective count for each of the plurality of detectors in the shared memory based on the respective detection signals.

36 Claims, 20 Drawing Sheets

(51) Int. Cl.
  *G01S 7/4865* (2020.01)
  *G01S 7/487* (2006.01)
  *G01S 7/4914* (2020.01)
  *G01S 7/493* (2006.01)
  *G06F 13/16* (2006.01)
  *G01S 7/481* (2006.01)
  *G01S 7/4915* (2020.01)

(52) U.S. Cl.
  CPC ............ *G01S 7/4914* (2013.01); *G01S 7/493* (2013.01); *G06F 13/1605* (2013.01); *G01S 7/4815* (2013.01); *G01S 7/4816* (2013.01); *G01S 7/4915* (2013.01)

(58) Field of Classification Search
  CPC .... G01S 7/4816; G01S 7/4865; G01S 7/4915; G01S 17/10; G01S 17/36; G06F 13/1605; G06F 13/16; G06F 13/14; G06F 13/364; G06F 13/372
  See application file for complete search history.

(56) References Cited

U.S. PATENT DOCUMENTS

| | | | |
|---|---|---|---|
| 10,557,925 B2 | 2/2020 | Wang et al. | |
| 10,838,066 B2 | 11/2020 | Ishii et al. | |
| 2014/0281828 A1* | 9/2014 | Micheloni | G06F 11/00 714/773 |
| 2017/0052065 A1 | 2/2017 | Sharma et al. | |
| 2017/0289524 A1 | 10/2017 | Pacala et al. | |
| 2018/0059224 A1 | 3/2018 | Wang et al. | |
| 2018/0180546 A1 | 6/2018 | Rothberg et al. | |
| 2018/0246214 A1 | 8/2018 | Ishii et al. | |
| 2020/0158836 A1 | 5/2020 | Henderson et al. | |
| 2020/0200873 A1* | 6/2020 | Schmidt | G01S 17/931 |
| 2020/0341144 A1* | 10/2020 | Pacala | G01S 17/894 |
| 2021/0126025 A1* | 4/2021 | Kennedy | H10F 39/12 |

FOREIGN PATENT DOCUMENTS

| | | |
|---|---|---|
| CN | 110537124 A | 12/2019 |
| WO | WO-2018015507 A1 * | 1/2018 |
| WO | 2018122560 A1 | 7/2018 |

OTHER PUBLICATIONS

CN202080048253.X , "Office Action", Sep. 24, 2024, 18 pages.
Notification of Transmittal of the International Search Report and the Written Opinion of the International Searching Authority, or the Declaration, in corresponding PCT Application No. PCT/US2020/030920 (Aug. 6, 2020).
Tsugawa et al. "Pixel/DRAM/logic 3-layer stacked CMOS image sensor technology" 2017 IEEE International Electron Devices Meeting (IDEM) (Dec. 2017).
Extended European Search Report corresponding to European Application No. 20798862.7 (12 pages) (Nov. 22, 2022).
Niclass et al. "A 0.18-μm CMOS SoC for a 100-m-Range 10-Frame/s 200x96-Pixel Time-of-Flight Depth Sensor" IEEE Journal of Solid-State Circuits 49(1):315-330 (Jan. 1, 2014).
CN202080048253.X , "Office Action", Apr. 26, 2025, 19 pages.

* cited by examiner

EVENT DRIVEN SHARED MEMORY PIXEL

CLAIM OF PRIORITY

This application is a 35 U.S.C. 371 national stage application of PCT International Application No. PCT/US2020/030920, filed on May 1, 2020, which claims priority from U.S. Provisional Application No. 62/841,315 filed May 1, 2019, entitled "EVENT DRIVEN SHARED MEMORY PIXEL", the entire content and disclosure of which are incorporated by reference herein.

FIELD

The present disclosure is directed to lidar systems, and more particularly, to methods and devices to provide shared memory in pixels of time-of-flight lidar systems.

BACKGROUND

Time of flight (ToF) based imaging is used in a number of applications including range finding, depth profiling, and 3D imaging (e.g., Light Detection And Ranging (LIDAR), also referred to herein as lidar). ToF 3D imaging systems can be categorized as indirect ToF (iToF) or direct ToF systems.

Direct ToF measurement includes directly measuring the length of time between emitting radiation by emitter element(s) of a LIDAR system, and sensing the radiation after reflection from an object or other target (also referred to herein as an echo signal) by detector element(s) of the LIDAR system. From this length of time, the distance to the target can be determined.

Indirect ToF measurement includes modulating the amplitude of the signals emitted by the emitter element(s) and measuring phases (e.g., with respect to delay or shift) of the echo signals received at the detector element(s). These phases may be measured with a series of separate measurements or samples. The results of these measurements produce multiple (e.g., two) vector components, the angle formed by these components is the phase angle. The distance d to the target can be calculated from the detected phase shift of the returning echo signal:

$$d = \frac{ct}{2} = \frac{\varphi}{2\pi} \frac{c}{2f_m}$$

where c is the speed of light, t is the time required for a photon to travel to the target and back to the detector, phi (φ) is the phase shift of the modulated signal and $f_m$ is the modulation frequency of the emitted signal.

Both direct and indirect ToF systems may utilize memory bins for distance calculation. For example, direct ToF systems may collect counts of arriving photons in some number of histogram bins which may be used to calculate the distance directly. Indirect ToF may also utilize bin storage as part of its distance calculation. Because indirect ToF systems may calculate a target's distance based on a finite number of phase measurements, indirect ToF systems may utilize fewer bins than direct ToF systems in some embodiments (e.g., at 0°, 90°, 180°, 270°, etc.).

SUMMARY

According to some embodiments of the present disclosure, a ToF system includes an incrementing circuit, and a plurality of pixels. Each of the pixels includes a plurality of detectors configured to output respective detection signals responsive to detection of a plurality of photons incident thereon and a shared memory configured to store a respective count of the photons incident on each of the plurality of detectors. The incrementing circuit is configured to update the respective count for each of the plurality of detectors in the shared memory based on the respective detection signals.

In some embodiments, the shared memory comprises a plurality of bins, and a subset of the plurality of bins is associated with a first detector of the plurality of detectors, and each bin of the subset is configured to store the respective count of the photons incident on the first detector during a time period.

In some embodiments, the ToF system further includes a bin sampling circuit configured to select a first bin from among the subset of the plurality of bins into which the respective count of the photons incident on the first detector is stored.

In some embodiments, the bin sampling circuit is further configured to be activated responsive to detection of the photons by the first detector.

In some embodiments, the bin sampling circuit is further configured to be held in reset by the first detector prior to the first detector detecting the photons.

In some embodiments, respective ones of the plurality of pixels further comprise a bus arbiter that controls access to the shared memory by the plurality of detectors of the pixel.

In some embodiments, the bus arbiter is configured to receive a plurality of requests from multiple ones of the plurality of detectors for access to the shared memory and, responsive thereto, select one detector of the plurality of detectors to be given access to the shared memory.

In some embodiments, the incrementing circuit is further configured to update the respective count for each of the plurality of detectors in the shared memory responsive to the respective detection signals output by one or more of the plurality of detectors.

In some embodiments, the incrementing circuit is an arithmetic logic unit (ALU) that is shared among the plurality of pixels.

In some embodiments, the ALU is configured to perform a read-increment-write operation on the shared memory of each of the pixels.

In some embodiments, at least one of the plurality of detectors is a Single Photon Avalanche Diode (SPAD).

In some embodiments, the incrementing circuit is further configured to update the respective count for each of the plurality of detectors for each of the plurality of pixels.

In some embodiments, at least one of pixels has an area of less than 3 µm by 3 µm.

In some embodiments, the pixel has a full-well depth of at least 10000 photons.

In some embodiments, the shared memory is a static random access memory (SRAM) or a dynamic random access memory (DRAM).

In some embodiments, the incrementing circuit comprises a Linear Feedback Shift Register (LFSR).

In some embodiments, the TOF system comprises a plurality of tiers, a first tier of the plurality of tiers comprises the detectors, and a second tier of the plurality of tiers comprises the shared memory.

In some embodiments, the incrementing circuit is further configured to update the respective count for each of the plurality of detectors responsive to comparison to a threshold value.

In some embodiments, the threshold value is based on a background level of light associated with a field of view of the ToF system or a capacity of the shared memory.

In some embodiments, the incrementing circuit is further configured to associate a respective counter with each bin of the subset of the plurality of bins and to update the counter based on whether the respective count of the photons incident on the first detector during the time period exceeds the threshold value.

According to some embodiments of the present disclosure, a ToF system includes an incrementing circuit and a plurality of pixels. Each pixel includes a plurality of detectors configured to output respective detection signals responsive to detection of a plurality of photons incident thereon, a shared memory comprising a plurality of bins, each bin configured to store a respective count of photons incident on one of the plurality of detectors during a respective time period, and a bin sampling circuit configured to select a first bin from among the plurality of bins into which the respective count of the photons incident on a first detector of the plurality of detectors is stored. The incrementing circuit is configured to update the respective count of the photons incident on the first detector in the shared memory at the first bin in the shared memory indicated by the bin sampling circuit.

In some embodiments, the bin sampling circuit is further configured to be activated responsive to detection of the photons by the first detector.

In some embodiments, the bin sampling circuit is further configured to be held in reset by the first detector prior to detection of the photons by the first detector.

In some embodiments, respective ones of the plurality of pixels further comprise a bus arbiter that controls access to the shared memory by the plurality of detectors of the pixel.

In some embodiments, the bus arbiter is configured to receive a plurality of requests from multiple ones of the plurality of detectors for access to the shared memory and, responsive thereto, select one detector of the plurality of detectors to be given access to the shared memory.

In some embodiments, the incrementing circuit is further configured to update the respective count for the first detector responsive to comparison to a threshold value.

In some embodiments, the threshold value is based on a background level of light associated with a field of view of the ToF system, a capacity of the shared memory, and/or a saturation level of digital conversion circuitry associated with the TOF system.

In some embodiments, a subset of the plurality of bins are associated with the first detector, and the incrementing circuit is further configured to associate a respective counter with each bin of the subset of the plurality of bins and to update the counter based on whether the respective count of the photons incident on the first detector during the time period exceeds the threshold value.

According to some embodiments of the present disclosure, a ToF system includes an incrementing circuit and a plurality of pixels. Each pixel includes a plurality of detectors configured to output respective detection signals responsive to detection of a plurality of photons incident thereon and a shared memory configured to store a respective count of the photons incident on each of the plurality of detectors. The incrementing circuit is configured to update the respective count for each of the plurality of detectors in the shared memory based on a comparison of the respective count to a threshold value.

In some embodiments, the threshold value is based on a background level of light associated with a field of view of the ToF system, a capacity of the shared memory, and/or a saturation level of digital conversion circuitry associated with the TOF system.

In some embodiments, the shared memory comprises a plurality of bins, and a subset of the plurality of bins is associated with a first detector of the plurality of detectors, each bin of the subset configured to store the respective count of the photons incident on the first detector during a time period In some embodiments, the incrementing circuit is further configured to associate a respective counter with each bin of the subset of the plurality of bins and to update the counter based on whether the respective count of the photons incident on the first detector during the time period exceeds the threshold value.

In some embodiments, the ToF system further includes a bin sampling circuit configured to select a first bin from among the subset of the plurality of bins into which the respective count of the photons incident on the first detector is stored.

In some embodiments, the bin sampling circuit is further configured to be activated responsive to detection of the photons by the first detector.

In some embodiments, the bin sampling circuit is further configured to be held in reset by the first detector prior to the first detector detecting the photons.

In some embodiments, respective ones of the plurality of pixels further comprise a bus arbiter that controls access to the shared memory by the plurality of detectors of the pixel.

In some embodiments, the bus arbiter is configured to receive a plurality of requests from multiple ones of the plurality of detectors for access to the shared memory and, responsive thereto, select one detector of the plurality of detectors to be given access to the shared memory.

DETAILED DESCRIPTION

Some embodiments described herein provide methods, systems, and devices including electronic circuits that provide a LIDAR system including one or more emitter elements (including semiconductor lasers, such as surface- or edge-emitting laser diodes; generally referred to herein as emitters) and/or one or more light detector elements (including semiconductor photodetectors, such as photodiodes, including avalanche photodiodes and single-photon avalanche detectors (SPADs); generally referred to herein as detectors). A control circuit may be coupled to the one or more emitter elements and/or to the one or more detector elements to coordinate emission of optical signals from the emitter element(s) and activation of the detector element(s) to output detection signals responsive to light comprising the optical signals incident thereon.

A flash LIDAR system may acquire a three-dimensional perspective (e.g., a point cloud) of one or more targets by emitting light from an array of emitters, or a subset of the array, for short durations (pulses) over a field of view (FoV) or scene, and detecting the echo signals reflected from the targets in the FoV at one or more detectors. A non-flash or scanning LIDAR system may generate image frames by raster scanning light emission (continuously) over a field of view or scene, for example, using a point scan or line scan to emit the necessary power per point and sequentially scan to reconstruct the full FoV.

Figure 1A:
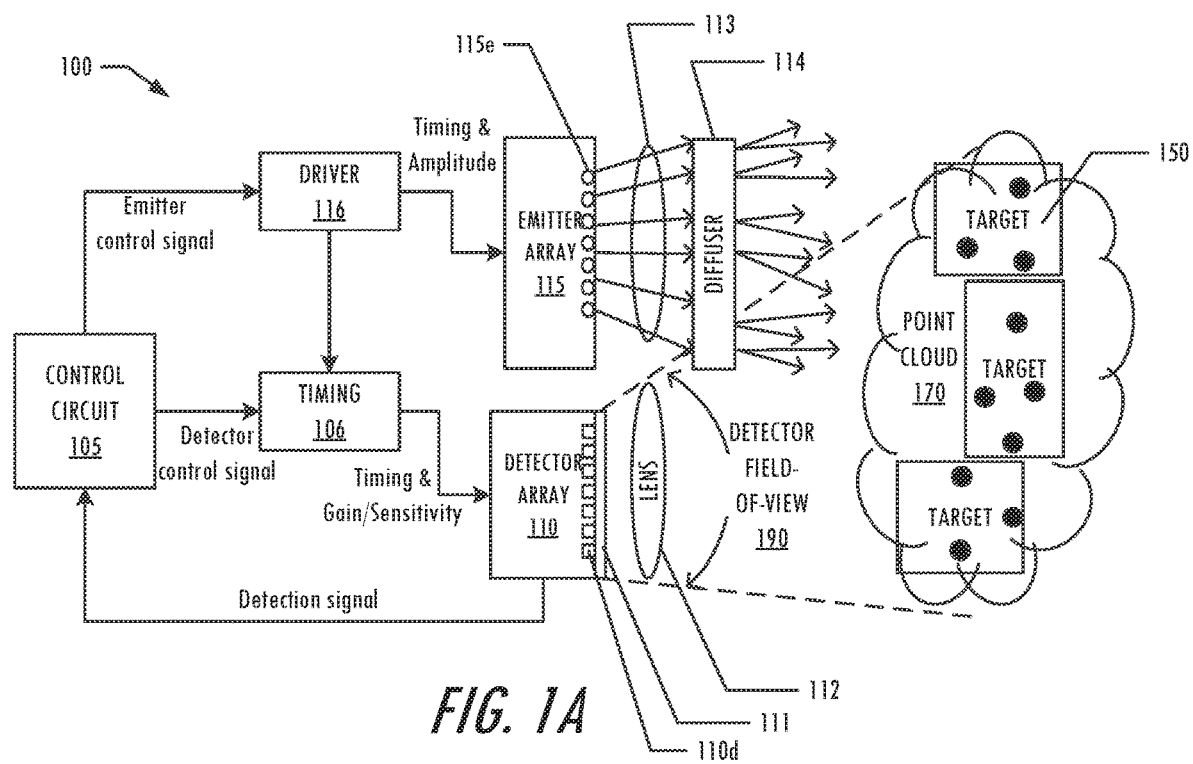
FIG. 1A is an example lidar system according to some embodiments described herein.

An example of a lidar system or circuit 100 in accordance with embodiments of the present disclosure is shown in FIG. 1A. The lidar system 100 includes a control circuit 105, a timing circuit 106, an emitter array 115 including a plurality of emitters 115e, and a detector array 110 including a plurality of detectors 110d. The detectors 110d include time-of-flight sensors. In some embodiments, the detectors 110d of the detector array 110 may include single-photon detectors, such as a SPAD array. SPAD arrays may be used as solid-state detectors in imaging applications where high sensitivity and timing resolution are desired.

One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e.

The emission of optical signals from multiple emitters 115e provides a single image frame for the flash lidar system 100. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1A.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable.

The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (e.g., SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115e and/or provides different signals (e.g., strobe signals) to the timing circuitry 106 of different detectors 110d to enable/disable the different detectors 110d so as to detect the echo signal from the target 150.

Figure 1B:
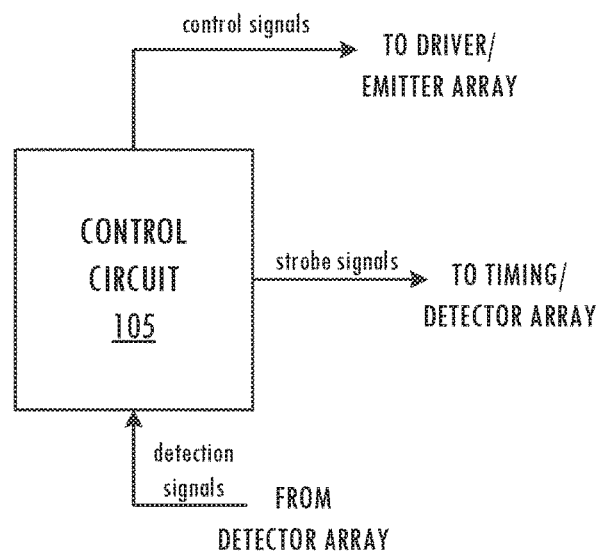
FIG. 1B is an example of a control circuit that generates emitter and/or detector control signals according to some embodiments described herein.

An example of a control circuit 105 that generates emitter and/or detector control signals is shown in FIG. 1B. The control circuit of FIG. 1B may represent one or more control circuits, for example, an emitter control circuit that is configured to provide the emitter control signals to the emitter array 115 and/or a detector control circuit that is configured to provide the strobe signals to the detector array 110 as described herein. Also, the control circuit 105 may include a sequencer circuit that is configured to coordinate operation of the emitters 115e and detectors 110d. More generally, the control circuit 105 may include one or more circuits that are configured to generate the respective detector signals that control the timing and/or durations of activation of the detectors 110d, and/or to generate respective emitter control signals that control the output of optical signals from the emitters 115e.

Operations of lidar systems in accordance with embodiments of the present invention, including measurement and calculation of a position of the target as described herein, may be performed by one or more processors or controllers, such as the control circuit shown in FIGS. 1A and/or 1B.

As noted above, in some embodiments, the sensing of the reflected radiation may be performed using a detector array 110 of single-photon detectors 110d, such as a SPAD array. A SPAD is based on a p-n junction device biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively or passively, to allow the device to be "reset" to detect further photons. The initiating charge carrier can be photo-electrically generated by a single incident photon striking the high field region. It is this feature which gives rise to the name 'Single Photon Avalanche Diode'. This single photon detection mode of operation is often referred to as 'Geiger Mode'.

The control circuit 105 may be configured to operate responsive to detected photons in the reflected radiation by implementing counter and/or summation/integration circuits in accordance with embodiments described herein. The counter and summation/integration circuits are operable to count and integrate the individual times of arrivals of the detected photons, respectively, in response to the output(s) of the detectors 110d of the detector array 110 that detect incident photons. The control circuit 105 may include analog and/or digital implementations of counting circuits and/or summing/integration circuits.

In particular examples, the control circuit 105 may include analog and/or digital implementations of counting circuits and/or summing/integration circuits that are operable responsive to inputs received from a detector array 110 (for example, a SPAD array) in response to detection of incident photons on the detector array 110. The control circuit 105 may be small enough to allow for three-dimensionally stacked implementations, with the detector array 110 "stacked" on top of a control circuit 105 that is sized to fit within an area or footprint of the detector array 110.

As discussed above, ToF systems may collect counts of arriving photons in some number of histogram bins (e.g., that are stored as memory locations in a shared memory) which may be used to calculate the distance to a target. For example, the ToF system may calculate a number of photons detected per bin, where the bins are arranged based on time since emission of the light by the emitter. For example, some embodiments may implement rolling center of mass calculation techniques, as described in U.S. patent application Ser. No. 16/688,0435 entitled "Digital Pixel" filed Nov. 19, 2019, the disclosure of which is incorporated by reference herein. Such rolling center of mass calculation for estimating ToA (time of arrival) may use a rolling sum of the number of triggered SPADs (without an individual TDC operation for each SPAD), as compared to timestamp summation and averaging techniques that require time to digital conversion.

As recognized by the inventors, ToF implementations incorporating SPAD histograms may have challenges with respect to being laid out in sub-10 μm pitch (e.g., having an area smaller than 10 μm by 10 μm) even in stacked technologies (e.g., having a digital processing node, which may have dimensions on the order of, for example, 55 nm, 40 nm, 28 nm, as the bottom tier) and a reasonable full-well depth (e.g., greater or equal to than 10 kphotons, where a kphoton is 1024 photons). The full-well depth of a device may refer to the amount of light (e.g., the number of photons) that a pixel can absorb before becoming saturated. In some embodiments, the full-well depth may indicate an upper limit of how high a bin may have to count for a particular application. Appropriate bin storage area may provide challenges for cost, resolution, power consumption, dynamic range, and/or module z-height (e.g., a height of the device) of 3D SPAD ToF imagers so that they may have difficulty being competitive in shorter range applications with modulated pixels.

One possibility for addressing these challenges is the use of shared memory. An example of shared memory that may be used is Static Random Access Memory (SRAM). SRAM is typically over twenty times more compact per bit than counters that are conventionally applied to SPAD pixels. A single bit in a counter may be represented by a D-type (or T-type) flip-flop with approximately thirty-two transistors in standard cell libraries. In addition a readout cell may be used per bit (usually a tristate buffer). SRAM provides its own challenges, however, in that the read-increment-write logic conventionally incorporated in SRAM configurations may be large and difficult to incorporate in a small pixel due to layout/space limitations.

Various embodiment described herein provide solutions that share an arithmetic logic unit (ALU) (also referred to herein as an incrementer) among multiple pixels. The use of the shared ALU may be time-multiplexed on a shared access memory (e.g., SRAM) bus. Some embodiments described herein include arrayable, area efficient, and/or low-power SPAD front-end circuitry to provide event driven access and arbitration of the shared SRAM memory bus. This solution may provide advantages in that the "cost" in terms of layout space of the ALU area per-pixel is driven down to a small overhead. Small time-bin pixels (e.g., from 10 μm down to 3 μm pitch) become possible and may include few kphoton (e.g, >10 bit) full-well capacity.

Figure 2:
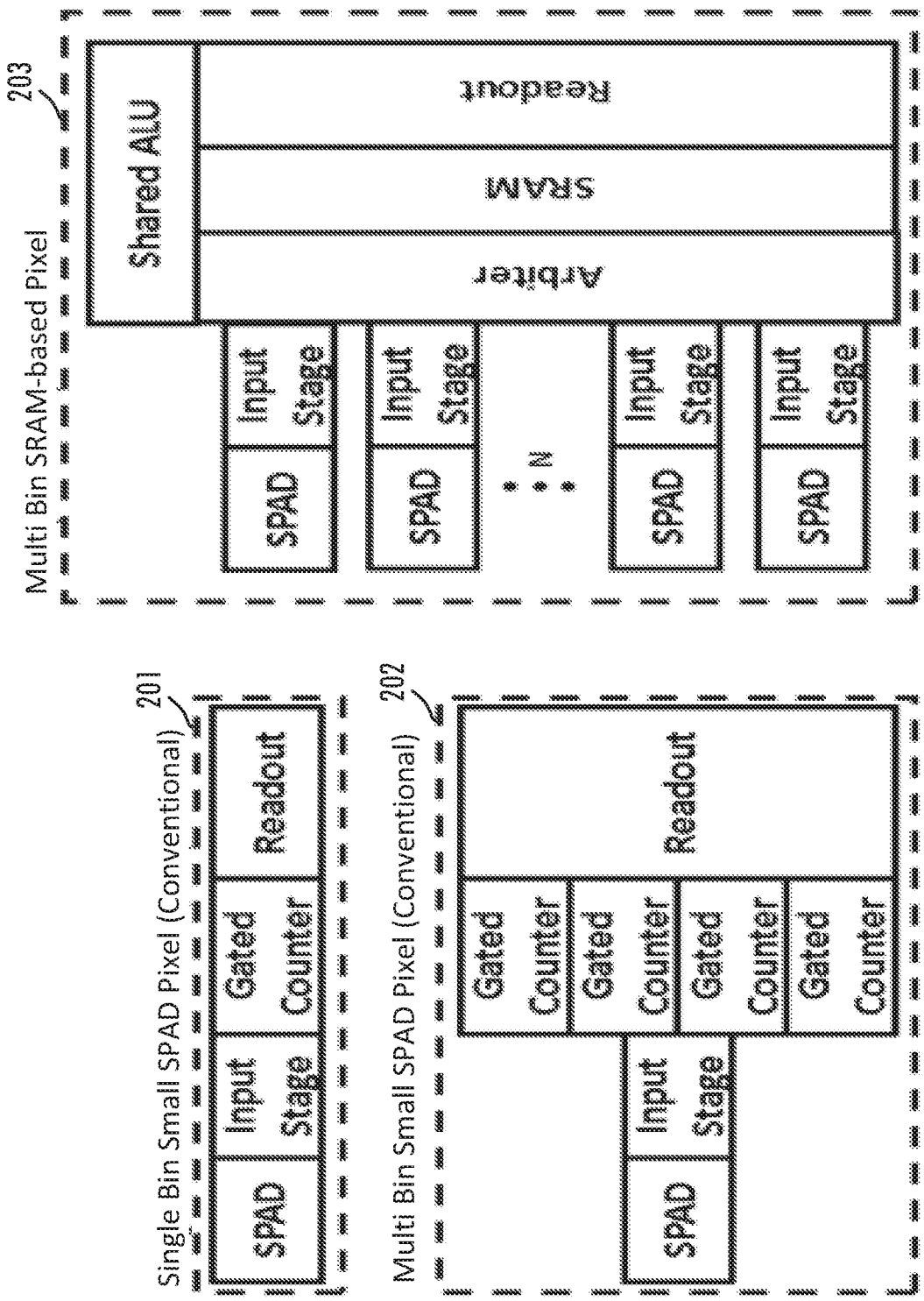
FIG. 2 is a schematic view comparing relative sizing and configuration of SPAD-based pixels, including pixels according to some embodiments of the present invention.

FIG. 2 is a schematic view comparing relative sizing and configuration of SPAD-based pixels, including pixels according to some embodiments of the present invention. FIG. 2 illustrates a conventional pixel 201 incorporating a single SPAD and a single bin, a conventional pixel 202 incorporating a single SPAD and multiple bins, and a pixel 203, according to some embodiments described herein, incorporating multiple SPADs and multiple bins. In FIG. 2, the relative the layouts of a conventional single bin pixel 201 and multi-bin SPAD pixel 202 are compared to that of an embodiment of a SPAD pixel 203 incorporating a shared SRAM bus, according to some embodiment of the invention. Because the SRAM elements used in embodiments of the present invention may be over twenty times more dense than counters conventionally used, a pixel 203 including N SPADs, where N is a natural number representing the number of SPADs, utilizing a shared SRAM may be contained in a relatively smaller footprint per SPAD (given the larger number of SPADs). For example, the per-pixel area overhead of the shared ALU may be divided by N, reducing its overall impact.

Though SRAM is described herein as an example of shared memory, other types of memory devices may be used, both volatile and non-volatile, without deviating from the scope of the present invention. For example, the memory shared between the SPADs may be dynamic RAM (DRAM). In some embodiments, the shared memory may be implemented as high bandwidth memory (HBM). In some embodiments, the shared memory may be implemented as resistive memory such as phase change RAM (PRAM), magnetic RAM (MRAM), and resistive RAM (RRAM). In addition, multiple variations of each type of memory may be supported. For example, with respect to SRAM, the embodiments described herein may be implemented using conventional 6T (six transistor) SRAM, 8T dual-port SRAM, single-ended 6T SRAM, and the like.

Updating a particular portion of the shared memory (e.g., a bin stored in the shared memory) may include a read-increment-write operation to read the currently stored value, increment the value (e.g., based on a detected photon), and write the updated value back out to the shared memory.

Performing the SRAM read-increment-write by a single ALU on a shared memory bus may utilize a bus-arbiter to avoid multiple SRAM cells being opened for read and corrupted by simultaneous SPAD events. In some embodiments, the SPADs that have detected a photon may indicate a request for access to the shared memory, such as by a signal (e.g., RequestB<i>). This issue may be improved by first freezing the SPAD samplers then eliminating multiple bus access requests (e.g., RequestB<i>) by using a chained SPAD arbitration circuit. In some embodiments, if multiple SPADs request access to the shared SRAM, one SPAD may be given access to the requested shared memory and the other SPAD requests may be eliminated and/or discarded. The shared pixel may then perform a read-increment-write cycle on a single SRAM cell. In some embodiments, the read-increment-write operation may take 1-2 ns. The read-increment-write operation may occur inside a SPAD dead time (also referred to as a quench time), which may be approximately 5 ns or less. Thus, an arbitration circuit may still allow peak rates of 10-100 MHz for up to 8-64× sharing.

Figure 3:
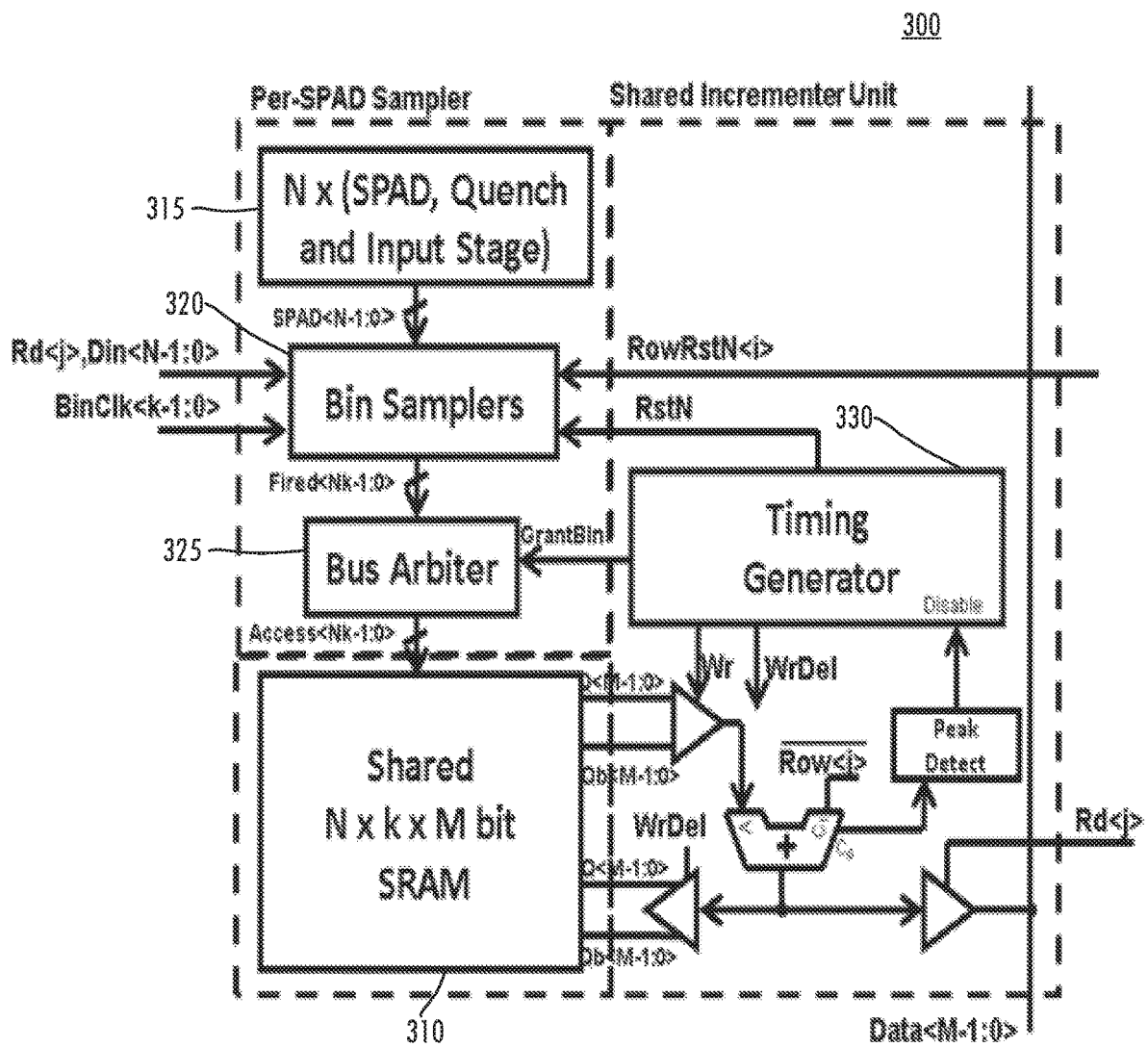
FIG. 3 is a schematic block diagram of a SPAD-based pixel architecture incorporating a shared SRAM according to some embodiments of the present invention.

An example implementation of a SPAD-based pixel architecture 300 incorporating a shared SRAM 310 according to some embodiments of the present invention is illustrated in FIG. 3. Referring to FIG. 3, pixel 300 includes N SPAD detectors 315, each having k M-bit bins implemented in SRAM 310, where N, k, and M are natural numbers. As illustrated in FIG. 3, the pixel 300 may also include bin samplers 320 and a bus arbiter 325, and may include a timing generator 330 to control the SRAM arbitration. In FIG. 3, the signal BinClk<k−1:0>, also referred to herein as the bin clock, may be used by the bin sampler to select a particular bin. For example, the bin clock may periodically signal high (e.g., a logic "one") for each of the k-bins at least once during a particular sampling period. The bin clock may be utilized by the SPAD to determine which of the k bins should be associated with a particular photon detection event.

The read-increment-write SRAM operation may be event-driven. The action of a SPAD firing and sampling a time bin (e.g., via a signal such as BinClk<k−1:0>) may activate the read-increment-write operation. Power may be consumed primarily only on SPAD activity. In other words, power associated with sampling the various bins in the SRAM 310 may primarily be expended when a SPAD 315 has detected photon activity, and otherwise power usage may be reduced in times of little to no detected photon activity. The front-end bin-clock sampler 320 may be designed to place a minimal capacitive load on the global bin clock waveforms to minimize power.

Use of the embodiments described herein may allow for a relatively high number of SPADs 315 per pixel 300 at a relatively small footprint. For example, the number of SRAM bits per bin can be determined by the following formula:

$$SRAMbitsPerBin = (PP^2 - (ALUarea/N + k * SliceArea + SFEarea))/(k * SRAMcellArea)$$

where PP is the pixel pitch, ALUarea is the area of the ALU, N is number of SPADs, k is number of bins per SPAD, SliceArea is the combined area of the sampler 320 and arbiter 325, SFEArea is the SPAD front-end area, and SRAMcellArea is the area of a utilized SRAM cell array 310 (e.g., a 6T SRAM cell). The SPAD front end area may include input stage circuitry. For example, as will be discussed further herein, the SPAD front-end area may include a quench circuit, a multiplexor, a delay, and/or other logic circuitry. The SPAD front-end area may be provided once per SPAD. Circuits related to the bins may occur k times per SPAD. Increment, readout, and timing circuits may occur once per N SPADs (e.g., per pixel 300).

For example, assuming that SFEArea=2 µm$^2$, SliceArea=3.5 µm$^2$, ALUarea=72 µm$^2$ (9 µm$^2$/bit), SRAM-cellArea=0.3 µm$^2$, a 10 µm pitch pixel, with 16 bins and 16 shared SPADs may be capable of approximately 8 bits per bin. This is only an example, and other configurations and sizes are possible. As another example, assuming the same areas as in the previous example, a 6 µm pitch pixel with k=4 and N=16 may be capable of approximately 12 bits per bin. At smaller pixel pitches, a smaller number of bins (k) may be used, which may be useful in ToF approaches utilizing fewer bins and/or fewer strobe windows.

For example, short range (e.g., 10 m) indirect ToF systems may benefit from the approach described herein. Embodiments described herein may provide a lower power of bin clock distribution to a digital SPAD array as compared to conventional gate modulation of photo diode (PD)-based modulated devices. Lower input referred noise of SPADs utilized in the present invention may also reduce overall indirect ToF system power with a suitable narrowband optical filter.

Figure 4:
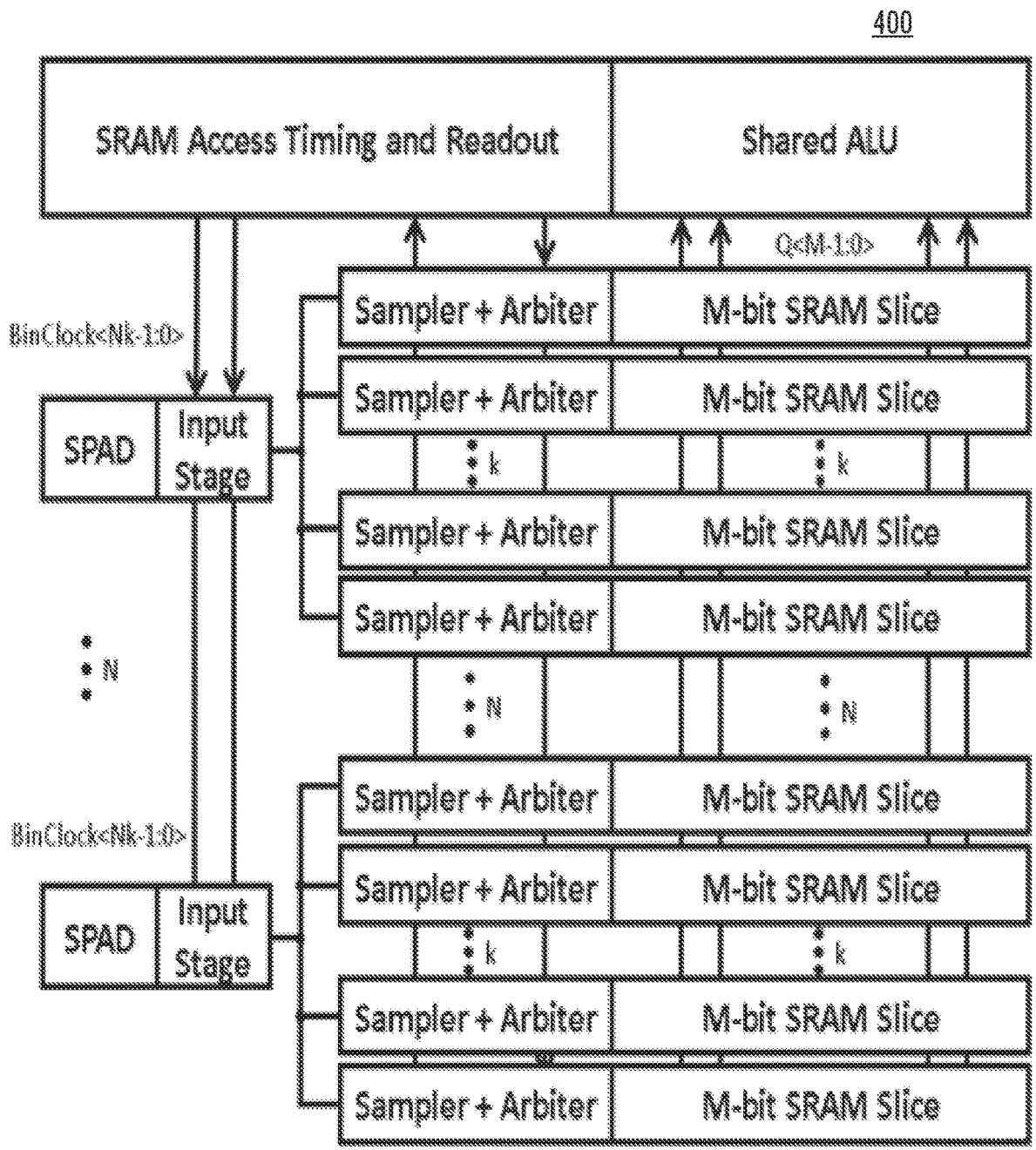
FIG. 4 is a schematic block diagram of another SPAD-based pixel architecture incorporating a shared SRAM according to some embodiments of the present invention.
Figure 5:
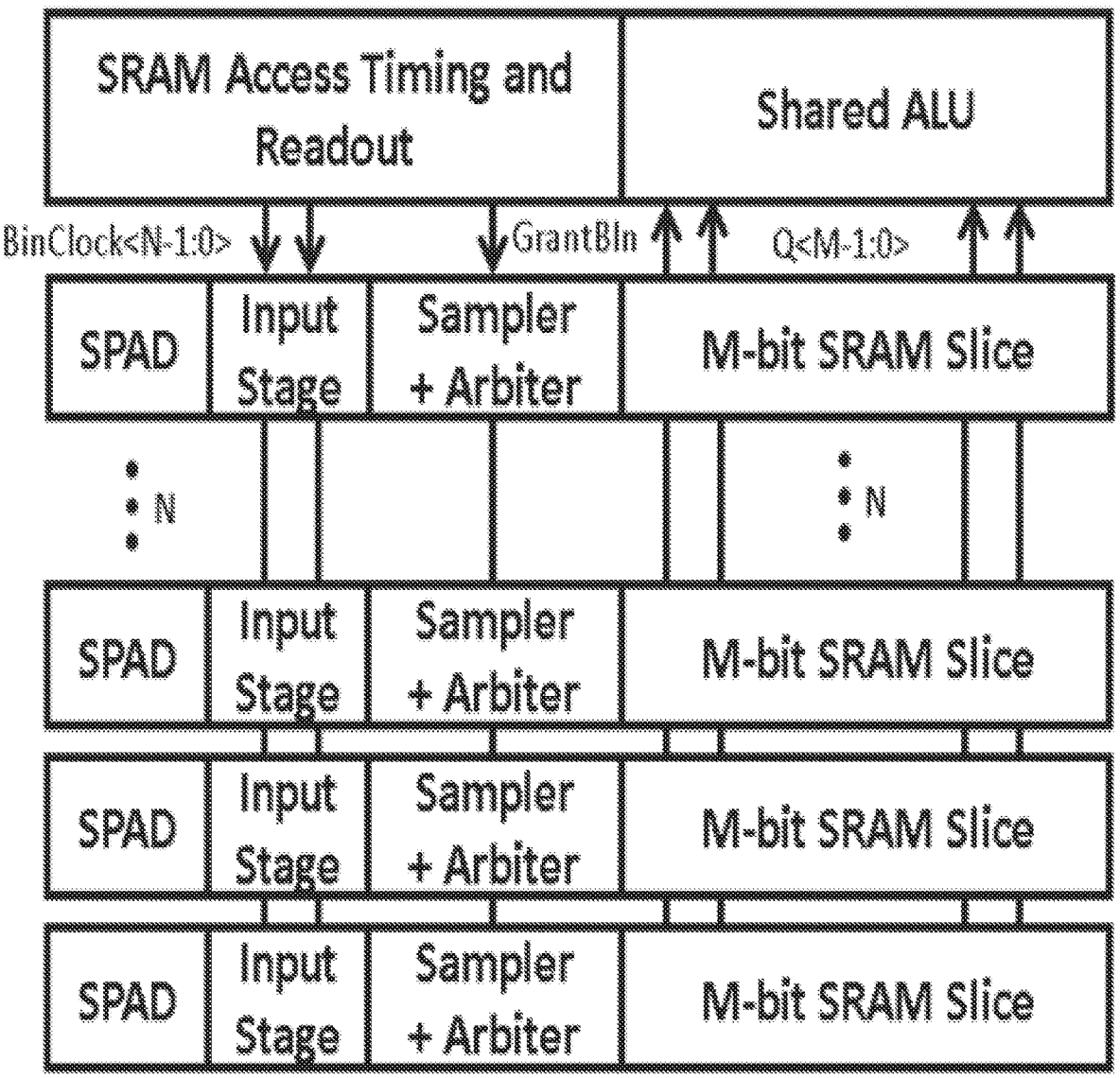
FIG. 5 is a schematic block diagram of another SPAD-based pixel architecture incorporating a shared SRAM according to some embodiments of the present invention.

As discussed herein, N SPADs may be organized into a pixel, each SPAD coupled to k-bins (e.g., multi-bin) that are implemented via a shared SRAM configuration. An example of such a pixel 400 is illustrated schematically in FIG. 4. In some embodiments, the pixel may include N SPADs, with each SPAD coupled to a single bin that is implemented via the shared SRAM configuration, as illustrated schematically by pixel 500 in FIG. 5.

Figure 6:
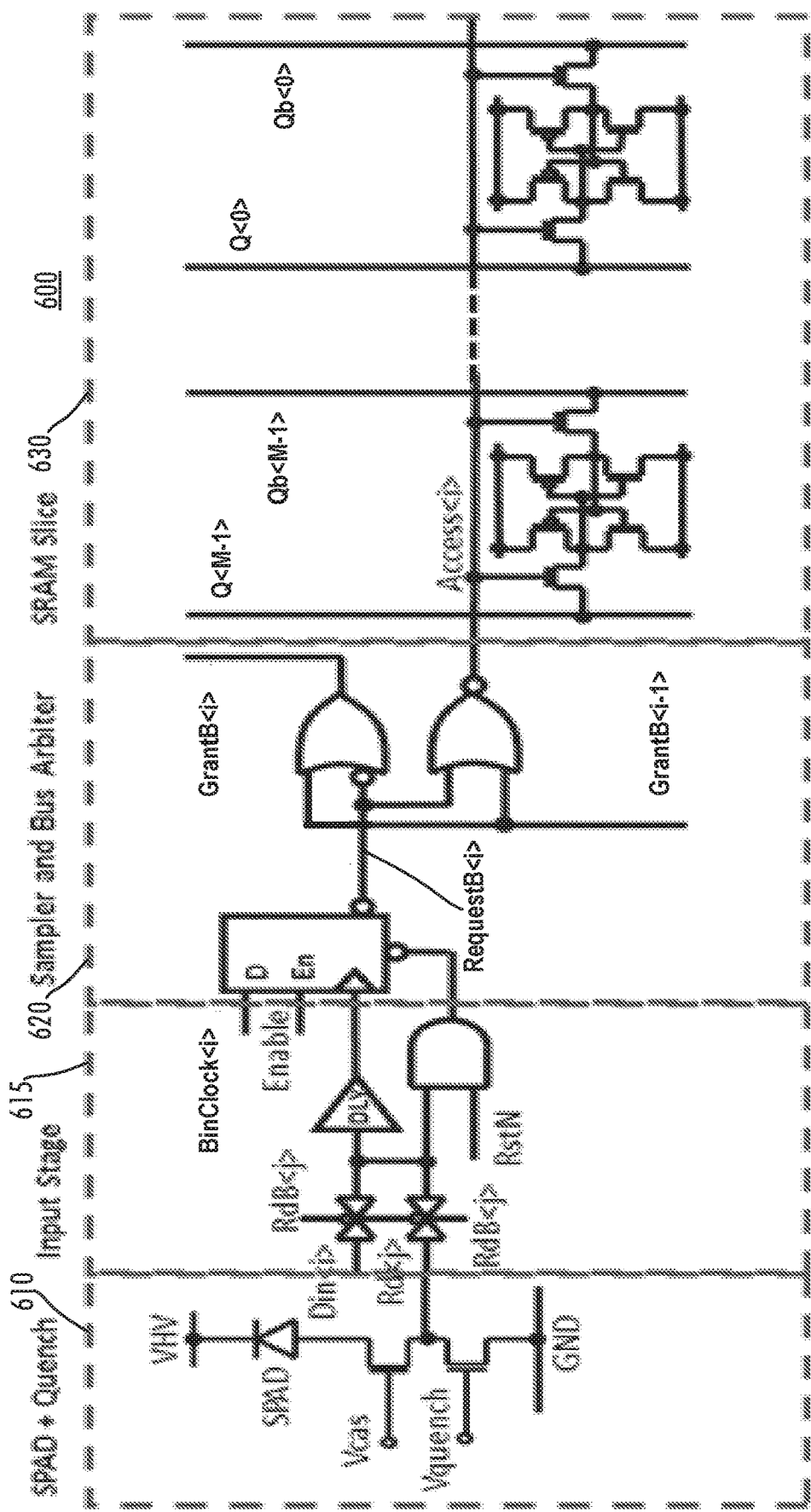
FIG. 6 is a schematic diagram of an additional example of an implementation of a single bin pixel incorporating shared SRAM according to some embodiments of the present invention.
Figure 7:
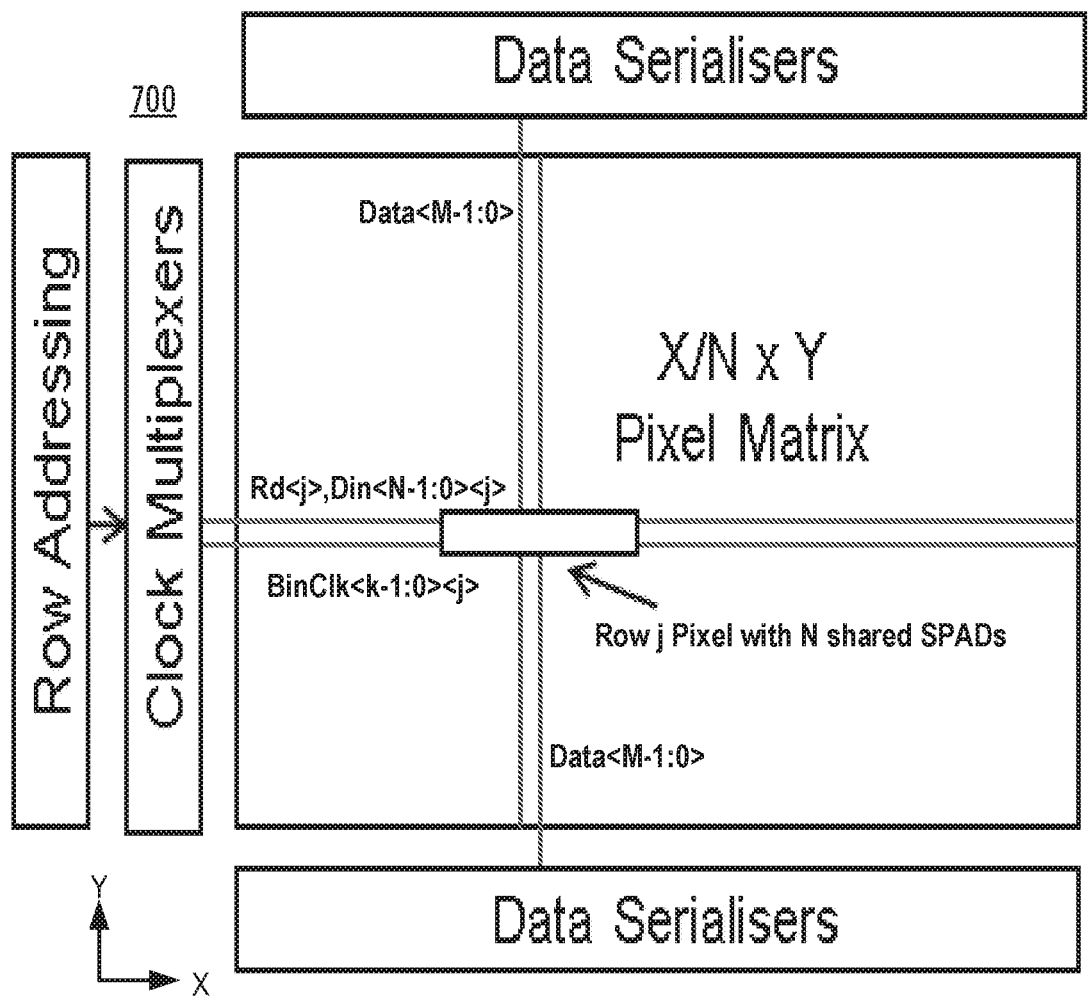
FIG. 7 is a schematic diagram of an example of a pixel array, according to some embodiments of the present invention.

FIG. 6 is a schematic diagram of an additional example of an implementation of a single bin pixel 600 incorporating shared SRAM 630 according to some embodiments of the present invention. FIG. 6 illustrates a view of a single SPAD 625 of a pixel such as, for example, pixel 500 of FIG. 5, with access to an SRAM slice 630, such as the M-bit SRAM slice of FIG. 5. As illustrated in FIG. 6, the pixel 600 may include a sampler and bus arbiter 620 that controls access to the SRAM slice 630 that is shared by the given pixel 600. The SPAD 610 (illustrated including the quench circuitry in FIG. 6) may request access to the SRAM slice 630 (e.g., via RequestB<i>). The pixel 600 may also include an input stage 615 that may include additional circuits, described further herein, and incorporates mechanisms to assist in performing a readout of the SRAM slice 630. The pixel 600 incorporating a shared SRAM 630 may be utilized within a pixel array, such as detector array 110 illustrated in FIG. 1A. An example of a possible X by Y pixel array 700 is illustrated in FIG. 7, realized as a matrix of X/N shared ALU units with sharing factor N in the x-direction and Y such units in the y-direction.

A control circuit (such as control circuit 105 in FIGS. 1A and 1B) may access the counts of photons detected by the pixel by performing a pixel readout. The readout may be performed row-by-row within the shared memory (e.g., the SRAM). To read out the row, the SPAD may be locked out from access during the readout. Referring, for example, to FIGS. 3 and 6, according to embodiments of the invention, readout of the SRAM may be accomplished by a multiplexer (MUX) allowing the bin sampler to be commanded by an external row-based one-shot code Din<i>. The Din<i> signal may allow the readout operation to simulate a SPAD event to gain access to the particular shared memory row. To perform the readout of the shared SRAM (e.g., SRAM array 310), a signal Din<i> may scan (e.g., iteratively) through all shared SRAM bins reading them out via the same access timing system as in increment mode. A carry in may be set to 0 when Rd<j> is asserted. The M-bit data word may be read from the internal SRAM bus to a column data bus, and the SRAM word may be reset to 0. Thus both readout and reset of the SRAM memory so as to be ready for integration of the next frame is accomplished in one step. A rolling frame readout may be implemented by activating Rd<j> sequentially through all rows.

Figure 8:
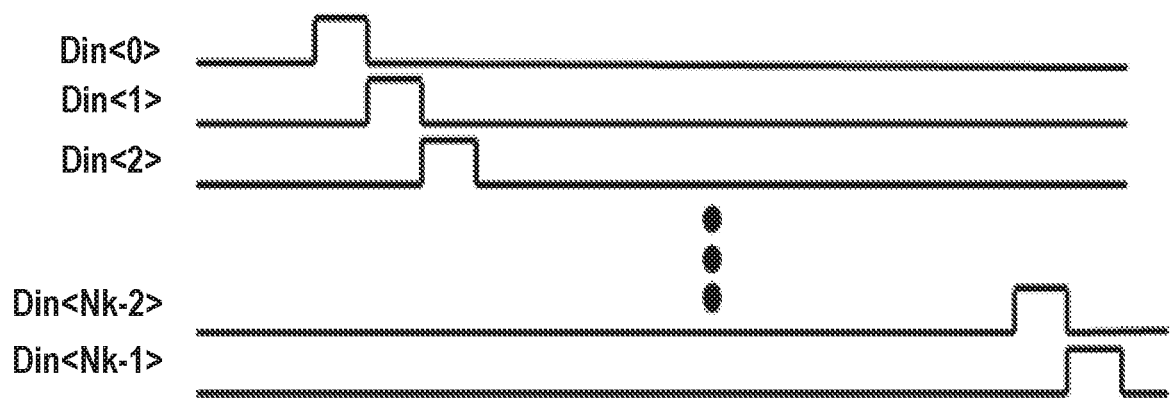
FIG. 8 illustrates an example readout timing of the Din signal according to embodiments described herein.

FIG. 8 illustrates an example readout timing of the Din signal according to embodiments described herein. Referring to FIGS. 3, 6, and 8, for a readout of row j, Rd<j>=1 and RdB<j> may be set to 0 and BinClk<Nk−1:0> may be set to 1. BinClk<Nk−1:0> for row j may be multiplexed to all 1's. All other rows of the Nr rows (e.g., rows (Nr−1 to j+1) and rows (j−1 to 0) that are not being read) may receive BinClk<Nk−1:0> as a series of phases synced to the laser with time intervals related to the laser pulse width.

Figure 9:
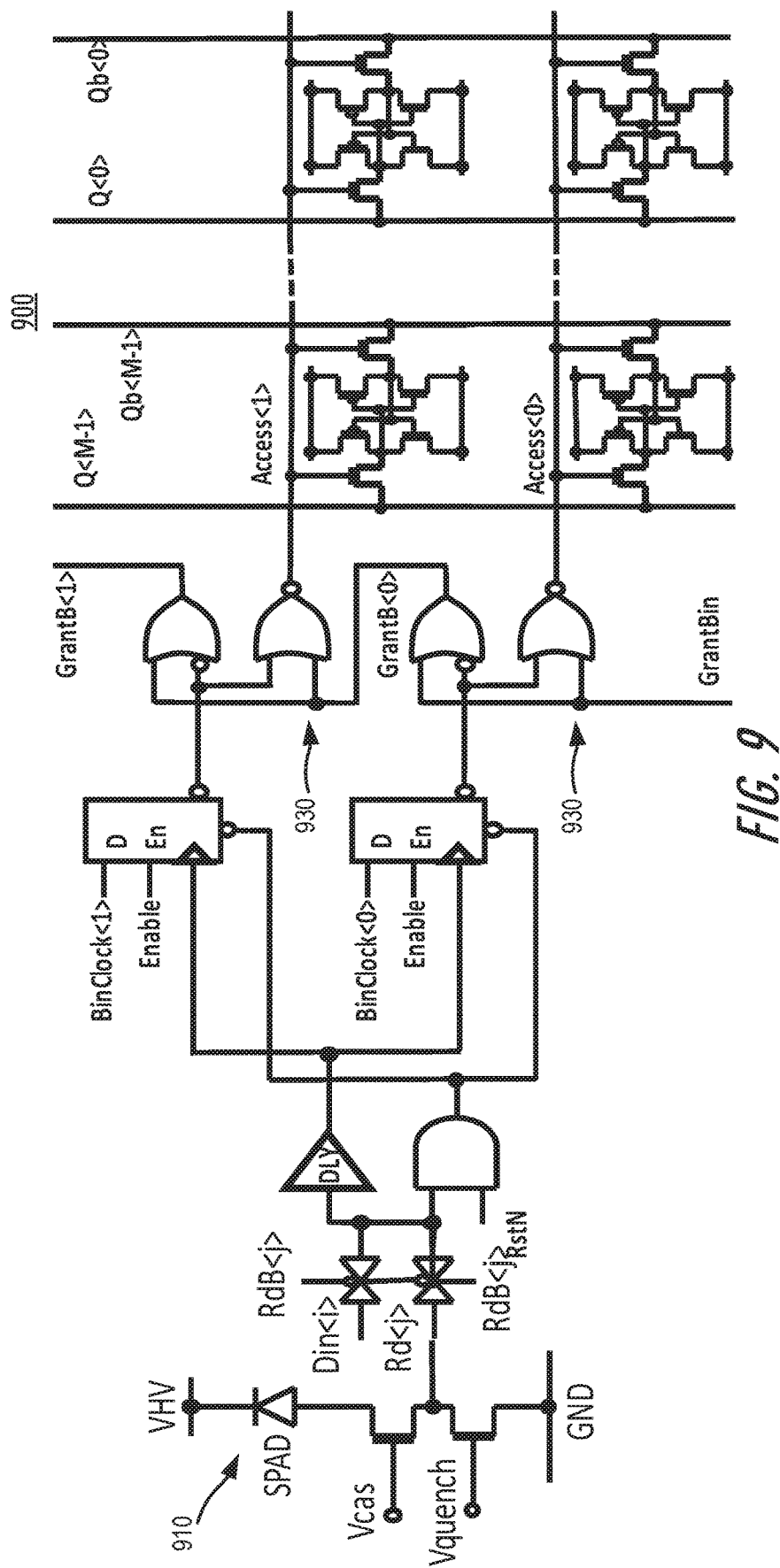
FIGS. 9 to 11 illustrate example pixel configurations according to embodiments described herein.
Figure 10:
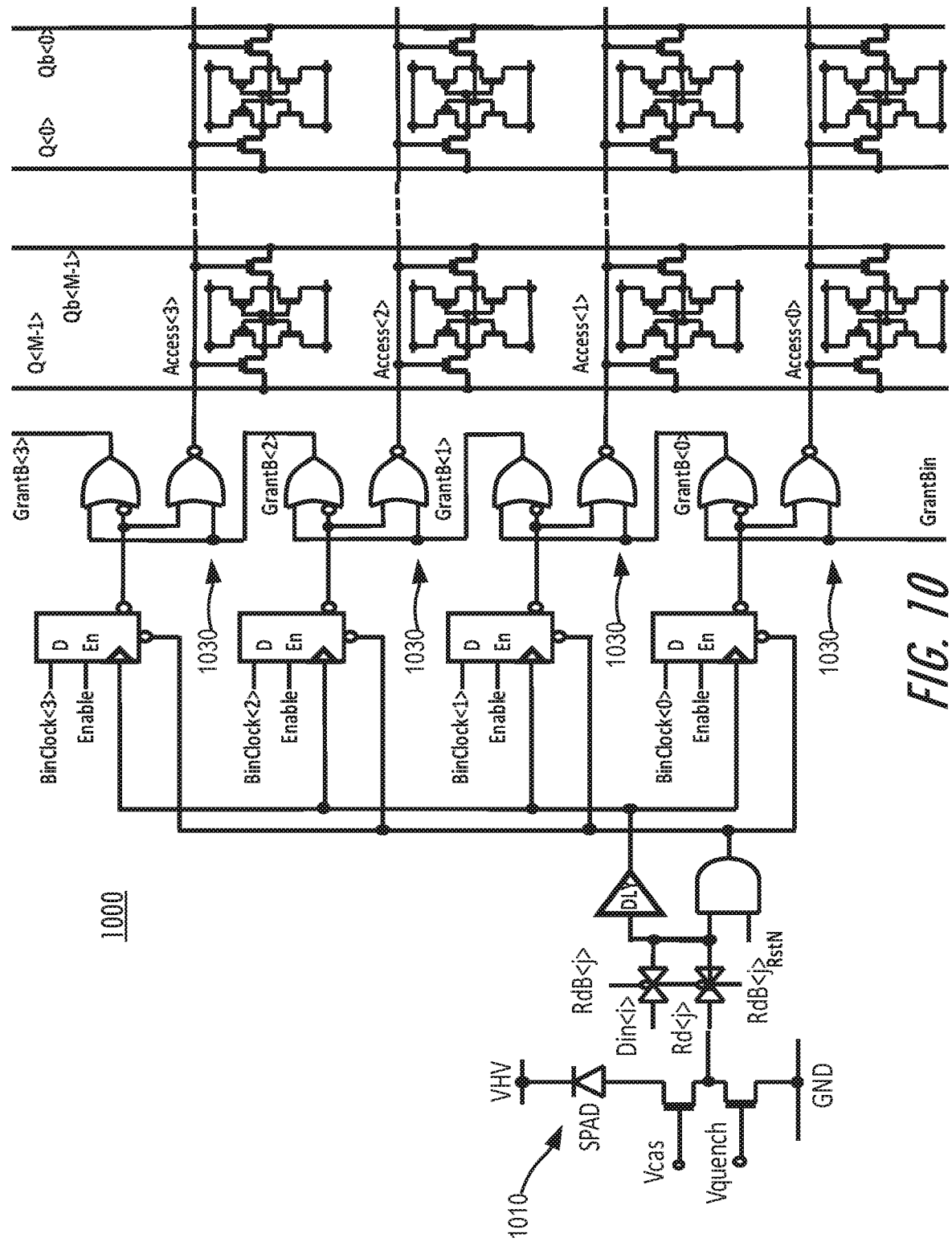
Figure 11:
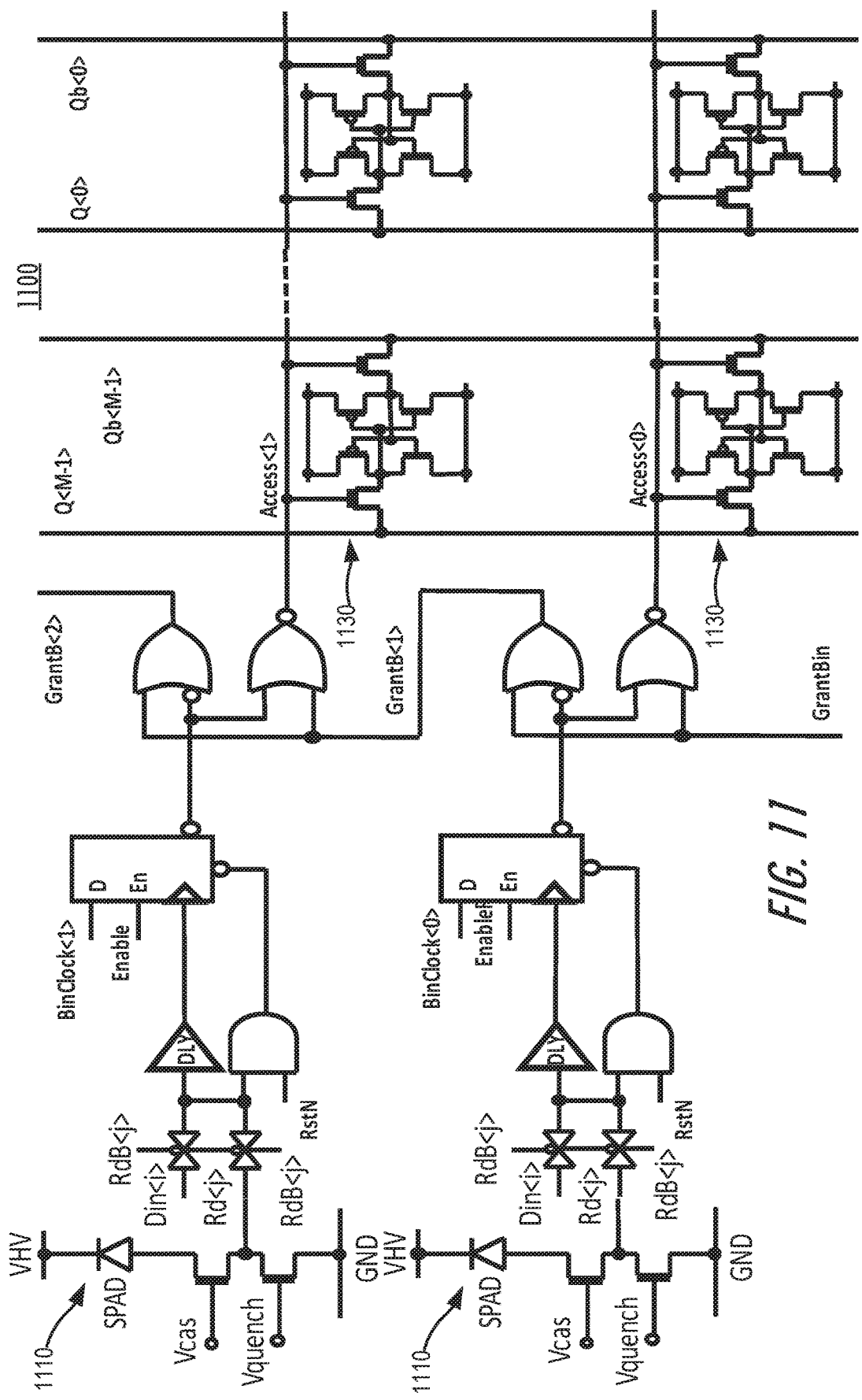

As will be well understood by one of ordinary skill in the art, multiple combinations are possible of pixel structures with one or more SPADs incorporating one or more bins utilizing shared SRAM. An example embodiment of a pixel configuration 900 incorporating a single SPAD 910 and two bins 930 according to embodiments of the present invention is illustrated in FIG. 9. An example embodiment of a pixel configuration 1000 incorporating a single SPAD 1010 and four bins 1030 according to embodiments of the present invention is illustrated in FIG. 10. An example embodiment of a pixel configuration 1100 incorporating two SPADs 1110, each having one bin 1130 according to embodiments of the present invention is illustrated in FIG. 11.

Figure 12:
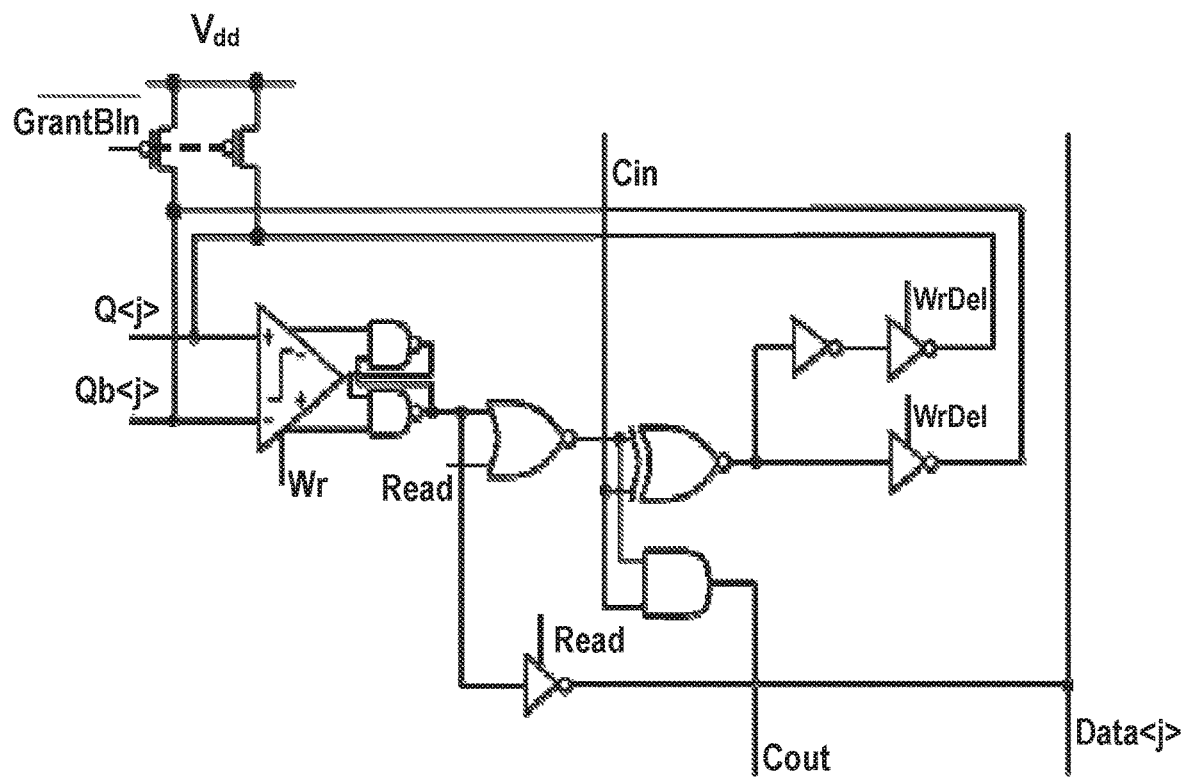
FIG. 12 is a schematic diagram of an ALU that may be shared to an individual pixel according to embodiment described herein.

As noted above, the ALU (e.g., incrementer) that accesses the shared SRAM may also be shared among multiple pixels of the pixel array. An example of a portion (e.g., a slice) of the ALU that may be shared to an individual pixel according to embodiment described herein is illustrated in FIG. 12.

In pixel embodiments such as those described herein, a bin clock may be used control the storage (e.g., which bin of a plurality of bins) to which a particular photon count is stored. The inventors have recognized that a conventional D flip-flop (DFF) drawn from a standard logic cell library sampling such a globally distributed bin clock may consume power by actively sampling the bin clock waveforms through an inverter chain within the DFF. In some embodiments as described herein, an efficient low power sampling of a global bin clock may be performed by a dynamic DFF that is held in reset by the SPAD. In such an embodiment, no or little power may be drawn from the global bin clock, and the DFF may only be clocked a small time offset (e.g., 100 ps) after the SPAD fires.

Figure 13:
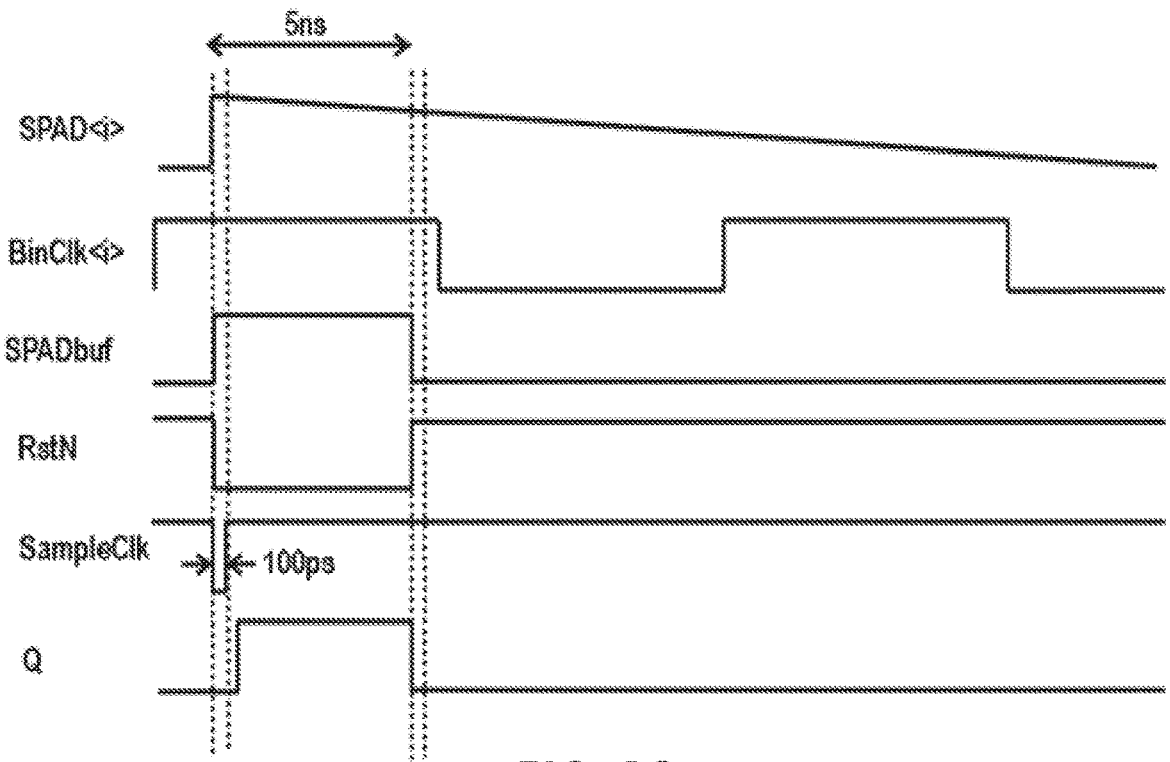
FIG. 13 is a timing diagram illustrating operations of a pixel according to embodiments described herein.

An example of a timing diagram for an operation in which the DFF is held in reset by the SPAD is illustrated in FIG. 13. In some embodiments, the SPAD may sample BinClk (e.g., as gated by SampleClk) late by a (e.g., 50-100 ps) gate delay offset with respect to the photon detection by the SPAD. This may represent a small (relative to bin time), but constant, time shift which can be easily calibrated.

With respect to timing, the DFF may be held in reset when the SPAD has not detected a photon (e.g., the DFF may be brought out of reset by a logical AND operation of the positive-going SPAD pulse with RstN in a high state). The DFF may be released from reset at substantially the same time instant as when the SPAD fires (e.g., SPAD<i>) and for duration of the SPAD dead time. Some power may now be consumed sampling the state of the bin clock. A rising edge may be generated on the sample clock at a gate delay (e.g., 50-100 ps) after the SPAD firing edge. This may sample the bin clock BinClk, and the output of the DFF (e.g., RequestB<i>) may transition to high or low. The DFF may be reset at the end of the SPAD dead time and the sample clock may be returned to a high state. This may result in no direct power draw from toggling the bin clock BinClk, with the exception of power due to gate charging (e.g., $fCV^2$).

Figure 14B:
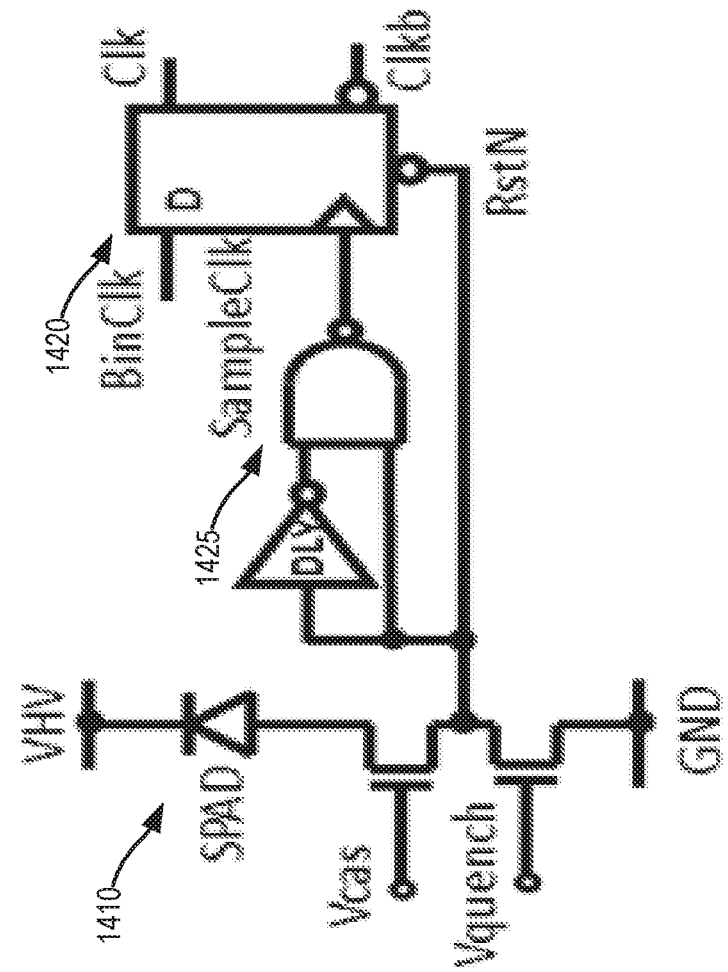
FIGS. 14A and 14B are schematic diagrams illustrating an offset sampler and a modification thereto, according to some embodiments described herein.
Figure 14A:
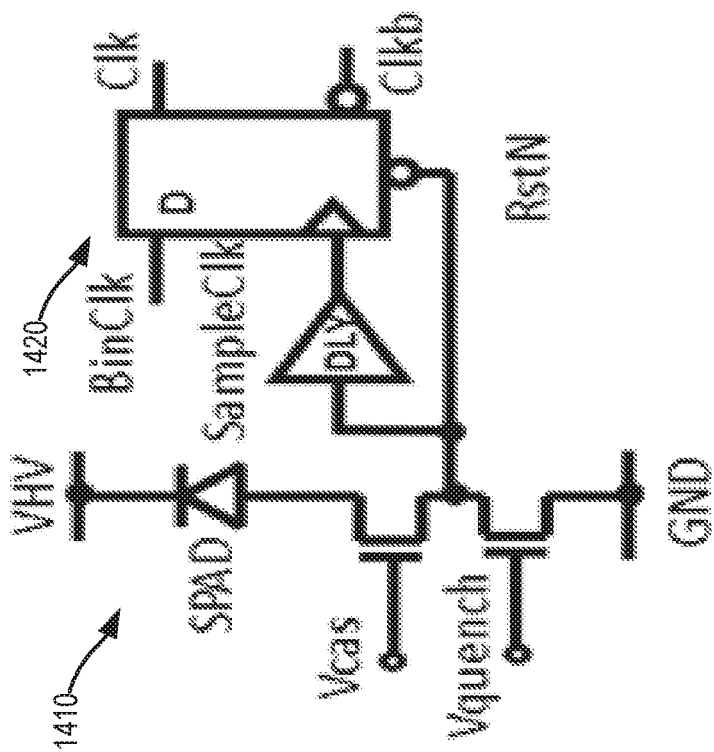

This approach can be applied to any DFF structure although dynamic DFFs may offer the most efficient area and power consumption. Dynamic DFF would not normally be considered for such a function due to the risk of leakage currents losing their state. However, in some embodiments described herein, DFFs may be used in their dynamic state (i.e. out of reset) only during the extremely short read-increment-write time of the SRAM (typically 1-2 ns). As a result, the possibility for the dynamic state to be lost due to leakage currents may be reduced and/or minimized. To keep the power low due to the high frequency input it may be useful to keep the clock input high when there is no photon detected by the SPAD. For example, FIG. 14A illustrates a SPAD 1410 and offset sampler 1420. FIG. 14B illustrates a modification 1425 to the time offset bin sampler 1420 configuration of FIG. 14A.

Figure 15A:
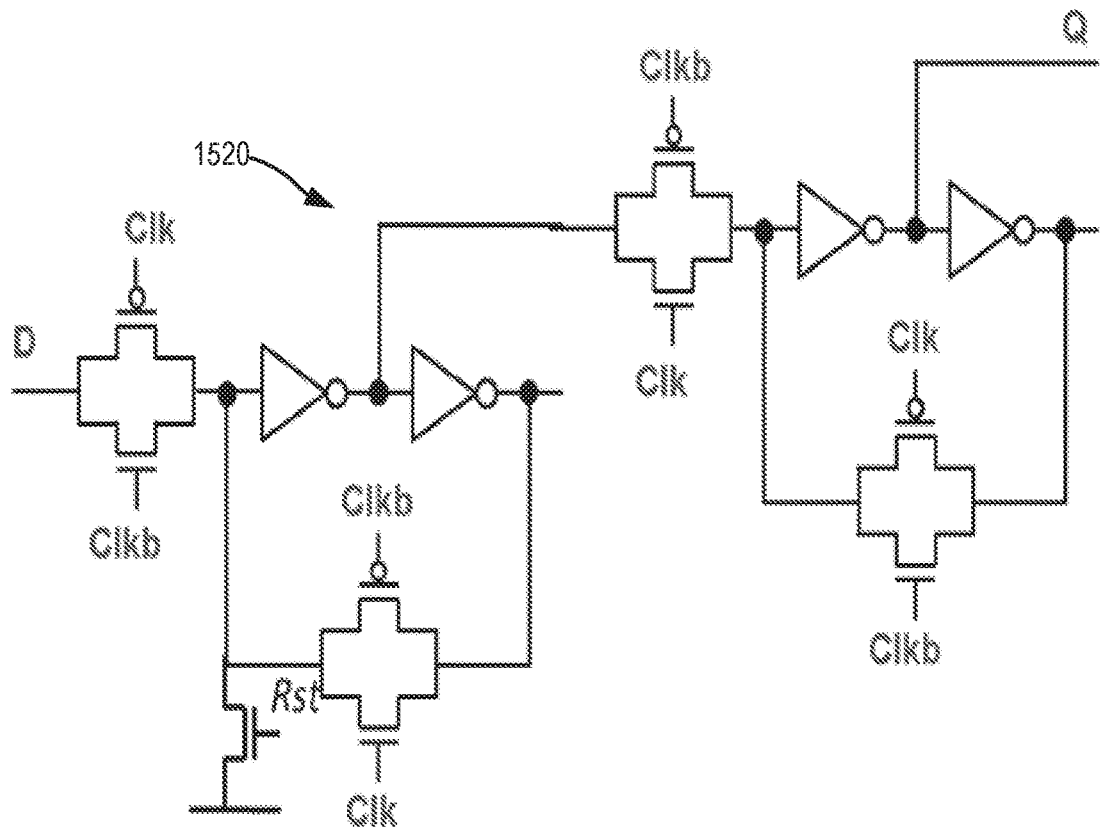
FIGS. 15A to 15C are schematic diagrams illustrating an offset sampler and a modification thereto, according to some embodiments described herein.
Figure 15B:
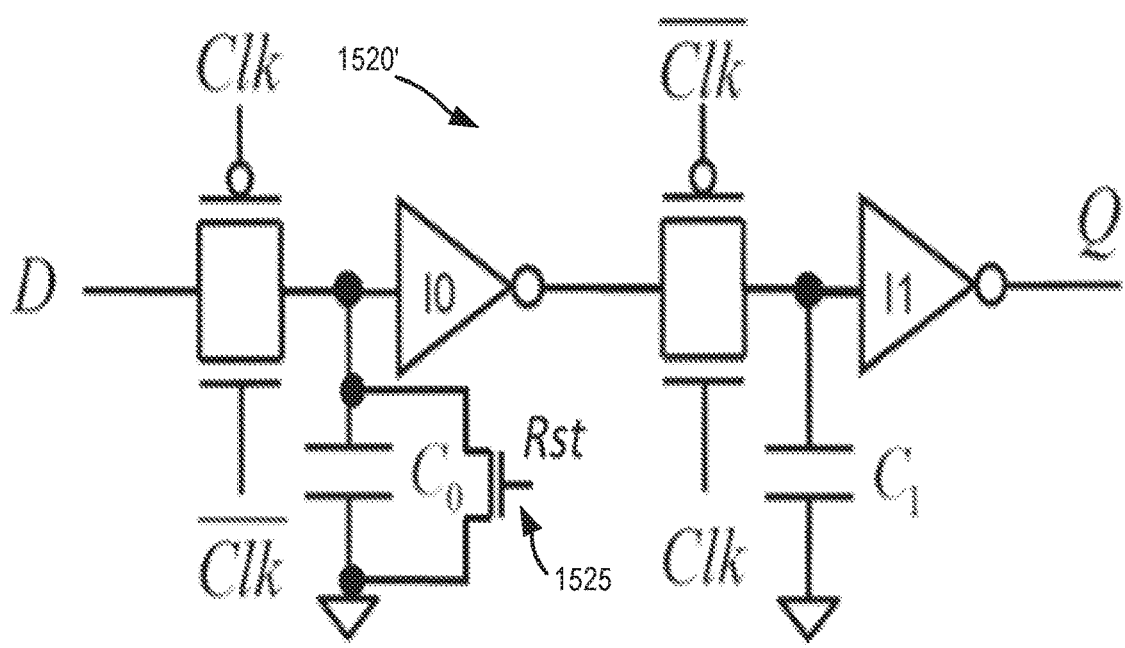

An example of a DFF bin sampler 1520 that may be conventionally used is illustrated in FIG. 15A. As can be seen in the circuit of FIG. 15A, the D input may be held in high impedance until SPAD fires. A DFF bin sampler 1520' according to some embodiments of the present invention is illustrated in FIG. 15B. As can be seen illustrated in FIG. 15B, additional reset logic 1525 may be added to the sampler 1520'. The D input may be held in high impedance until the SPAD fires. The embodiment illustrated in FIG. 15B may be area efficient and fully dynamic (e.g., the sampler 1520' only needs to hold for the time of the read-increment-write operation, which is typically 1-2 ns).

Figure 15C:
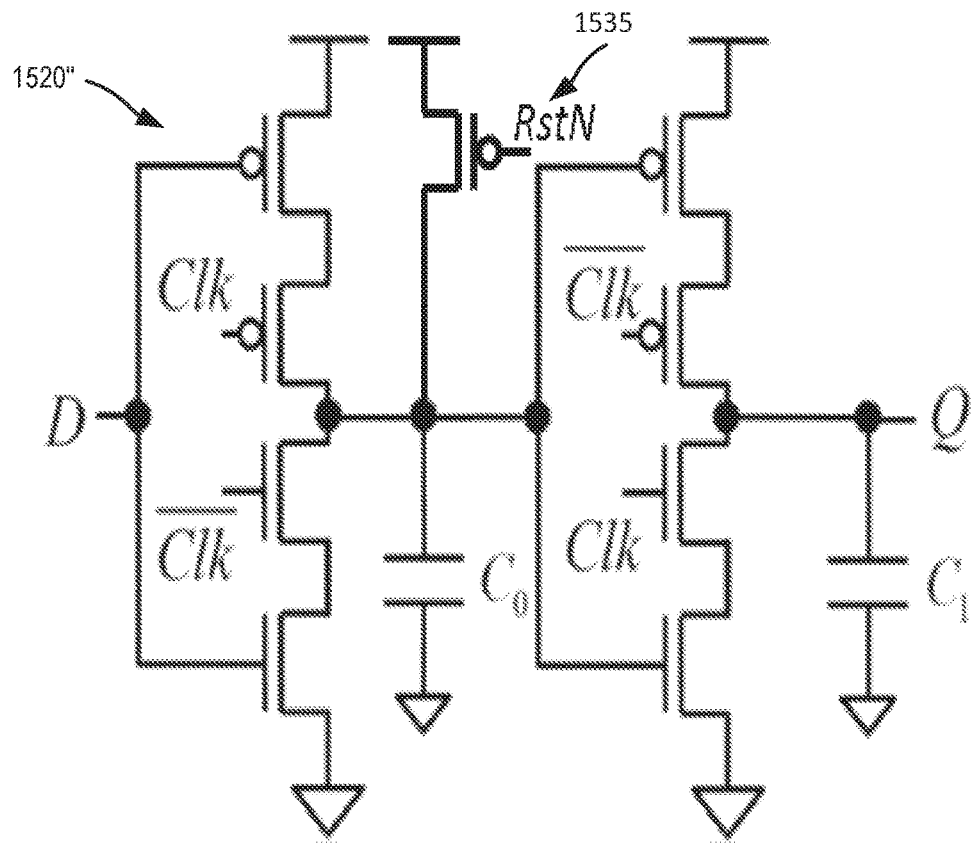

FIG. 15C illustrates a Clocked CMOS (CMOS) DFF bin sampler 1520". As with the sampler 1520' of FIG. 15C, additional reset logic 1535 may be added to the sampler, and the D input may be held in high impedance until the SPAD fires. The embodiment illustrated in FIG. 15C may be area efficient and fully dynamic (e.g., the sampler may only need to hold for SPAD dead time of, for example, 5 ns).

Figure 16:
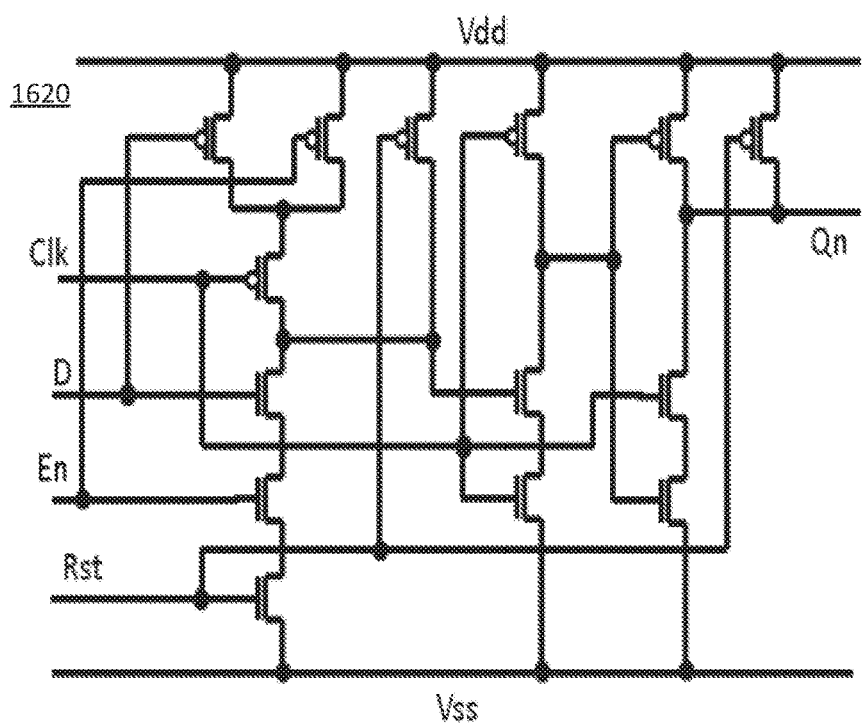
FIG. 16 is a schematic diagram of a true single-phase clock (TSPC) flip-flop sampler, according to some embodiments described herein.

A true single-phase clock (TSPC) flip-flop sampler 1620 is illustrated in FIG. 16. The TSPC semi-dynamic flip-flop 1620 may be a good choice for a bin sampler for a number of reasons. For example, the TSPC flip-flop sampler 1620 may be held in reset until a SPAD event occurs and may only have to hold its state for the SPAD dead time (e.g., 5 ns). In addition, the TSPC flip-flop sampler 1620 may provide edge triggered sampling of the bin clock and may consumes energy only, or primarily, during the SPAD rising edge. Also, with the TSPC flip-flop sampler 1620, a load on the bin clock is two minimum size MOSFET gate capacitances, and no shoot-through current may be present with the TSPC flip-flop sampler 1620 as in conventional library DFF configurations which re-buffer the bin clock. The TSPC flip-flop sampler 1620 may also have a very small layout circuit area (~2.5 mm² in 40 nm).

Figure 17A:
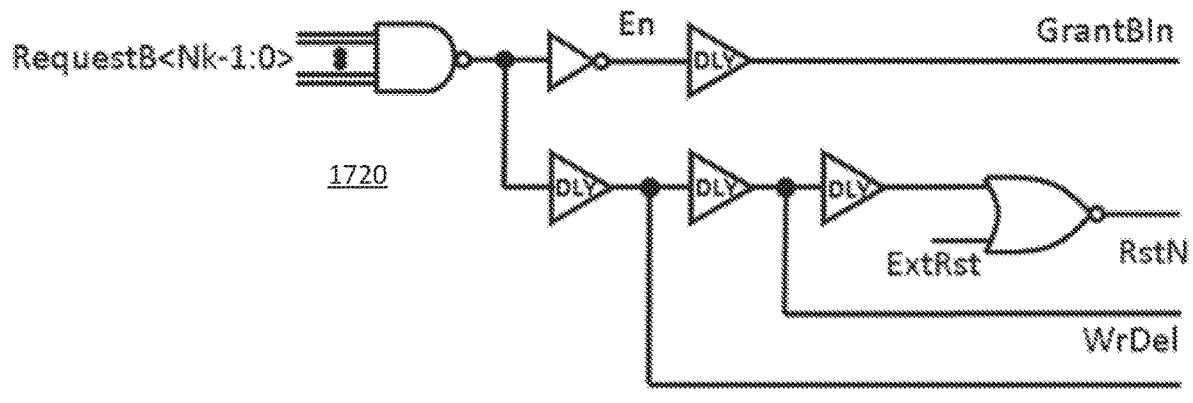
FIG. 17A illustrates an example embodiment of a shared ALU in-pixel timing generator, according to embodiments described herein.
Figure 17B:
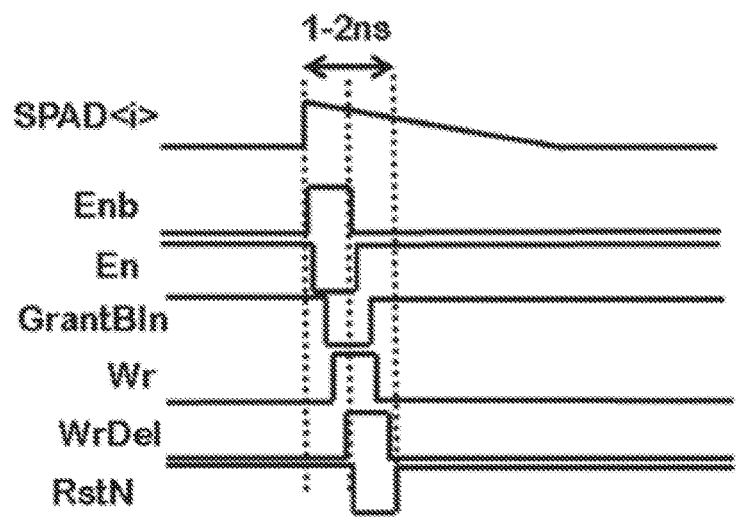
FIGS. 17B and 17C are timing diagrams of signals associated with the ALU in-pixel timing generator of FIG. 17A.
Figure 17C:
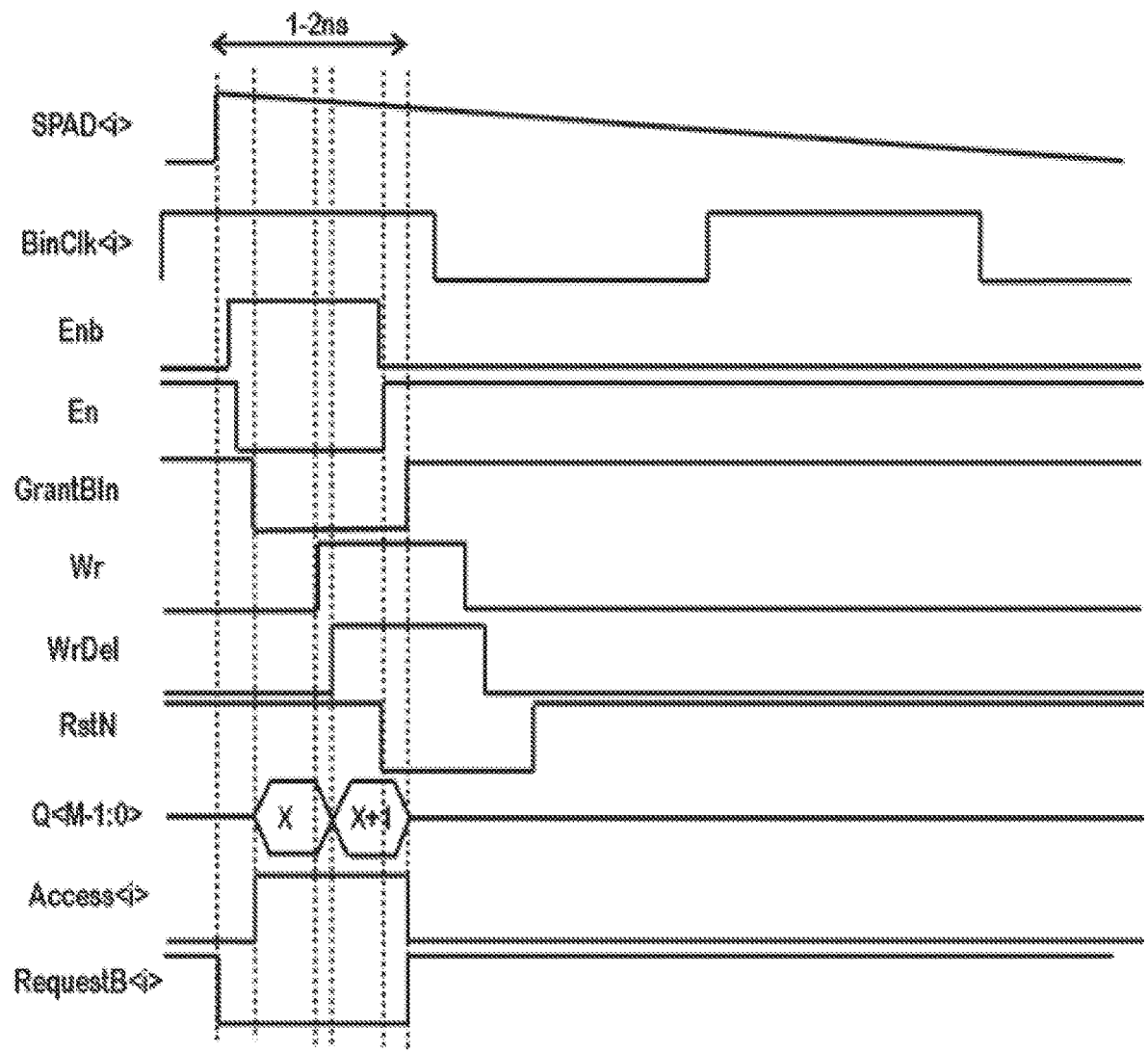

An example embodiment of the shared ALU in-pixel timing generator 1720, according to embodiments described herein is illustrated in FIG. 17A. Additional detail is also illustrated showing some timings of the signals associate with the ALU in-pixel timing generator are illustrated in FIGS. 17B and 17C. As illustrated in FIGS. 17B and 17C, the $i^{th}$ SPAD may fire (rising edge) upon detecting a photon asynchronously to the BinClk (a 2-bin iTOF example is shown). Then all N*k samplers may be disabled after a gate delay (e.g., En goes low, e.g., transitions from a logic 1 to a logic 0) preventing any other SPAD events from requesting access to the SRAM. The GrantBIn signal may go low allowing the first sampler with a low RequestB<i> in sequence to access the SRAM via the signal Access<i> and disallowing all others. The $i^{th}$ SRAM M-bit word with state X may be driven onto the shared bus (e.g., Q<M−1:0>). When the write (Wr) signal transitions from low to high, the SRAM bus state may be sampled by the differential edge triggered latch generating a rail-to-rail M-bit word with value X as input to the ALU incrementer, which may then output a value X+1. This output may be driven back onto the shared SRAM bus and written into the currently accessed SRAM word indicated by Access<i>. Subsequently, Access<i> may go low leaving the SRAM shared bus floating, the samplers are re-enabled (e.g., En=1) and the ALU may be put back into read state by Wr=0 being set low.

In some embodiments of the present invention, a rolling SRAM read-increment-write operation may be provided. The shared-ALU may be operated in a non-event driven mode by performing continuous rolling read-increment-write. This may utilize more power as a rolling GrantB<i> signal (e.g., see FIG. 18) may be distributed to the whole array and may pass through all bins regardless of whether they have detected a photon or not. The pixel utilizing the rolling SRAM read-increment-write operation may be less susceptible to pile up (e.g., a queueing up of activated SPADS and/or discarding of SPAD detection signals) as multiple events occurring together can be written serially to the SRAM bank.

Figure 18:
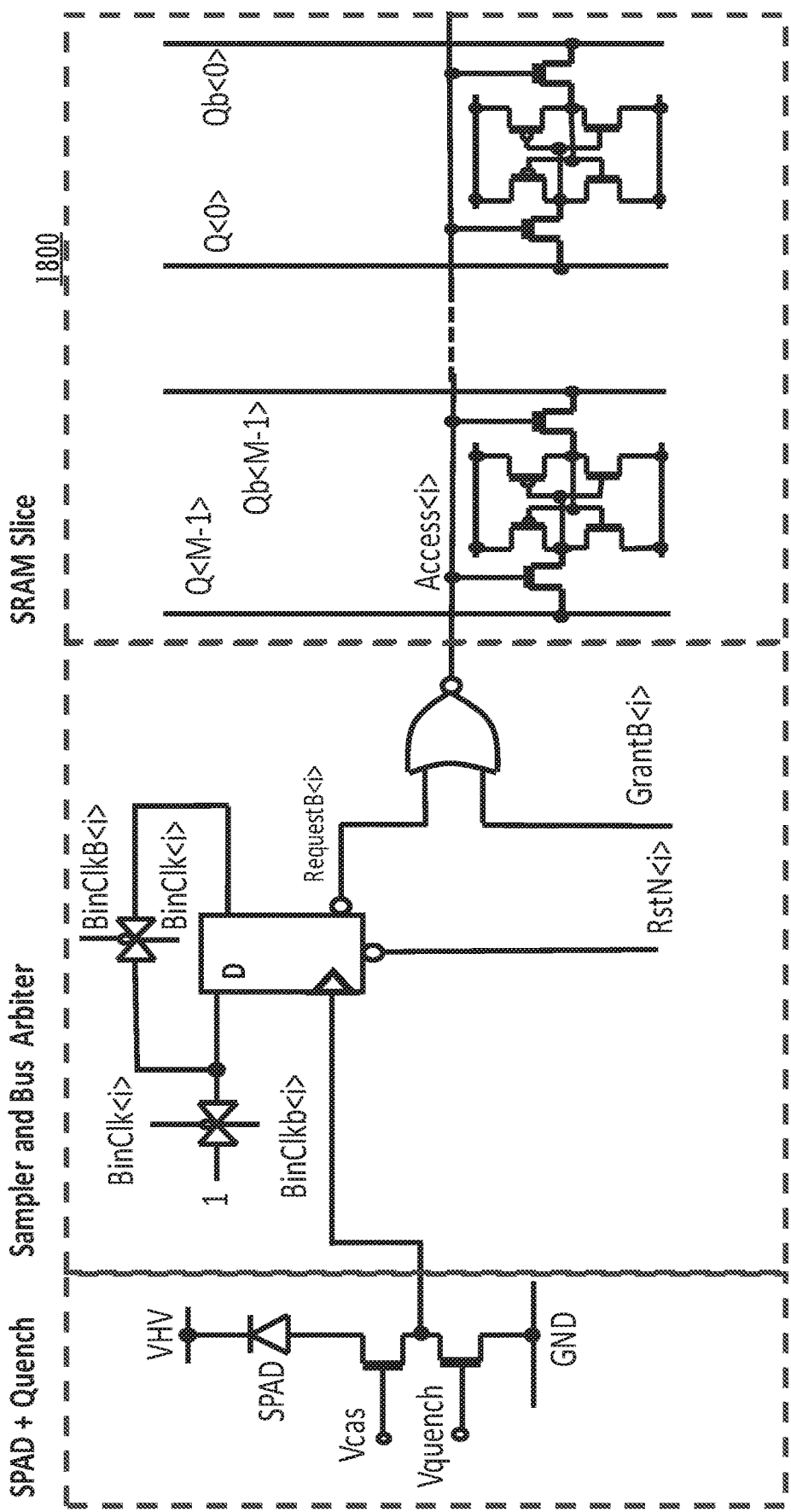
FIG. 18 is a schematic diagram of an example embodiment of a 1-bin pixel with rolling SRAM read-increment-write, according to some embodiments described herein.

FIG. 18 is a schematic diagram of an example embodiment of a 1-bin pixel with rolling SRAM read-increment-write, according to some embodiments described herein. The present invention is not limited to the embodiments illustrated in FIG. 18, and one of ordinary skill in the art will recognize that other embodiments are possible without deviating from the scope of the present invention.

In embodiments utilizing a shared SRAM, such as those described herein, the SPAD, SRAM, and ALU may be arranged or stacked on different/respective levels in a tiered architecture. For example, a SPAD may be placed on a top tier, the shared memory (e.g., SRAM and/or DRAM) may be placed on an intermediate tier, and the shared ALU and per-pixel logic may be placed on a bottom tier (e.g., relative to a substrate or submount). Methods for such stacking are described in "Pixel/DRAM/logic 3-layer stacked CMOS image sensor technology," by H. Tsugawa et al. IEDM 2017. An example of such a tiered embodiment is illustrated in FIG. 19.

Figure 19:
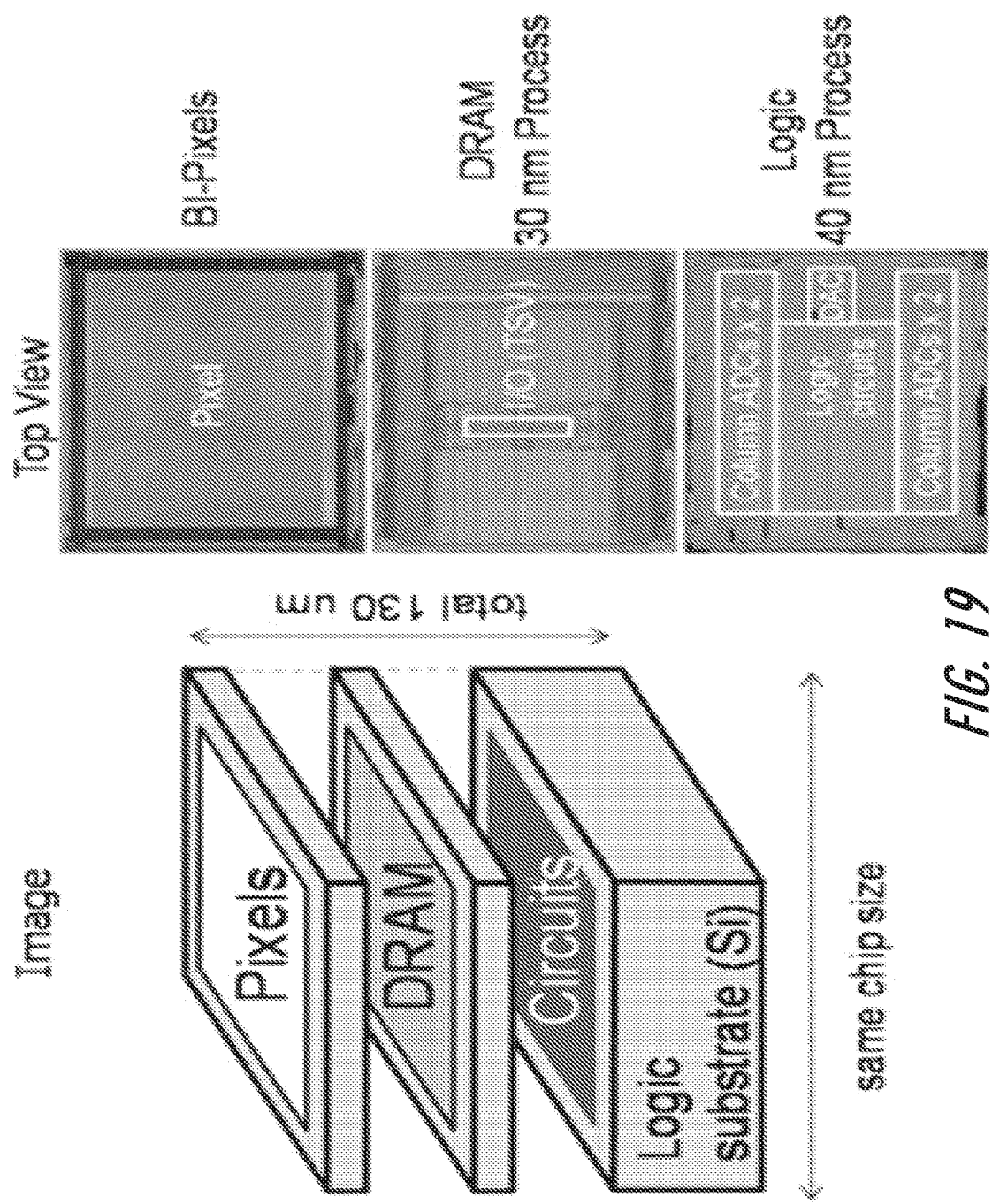
FIG. 19 is a block diagram illustrated an example of a tiered embodiment of a tiered memory structure.

The tiered embodiment illustrated in FIG. 19 differs from the embodiments described herein at least in that the DRAM is not directly accessed from each pixel, but instead through ADCs and an image signal processor. The embodiments described herein may use the shared memory directly for integrating the pixel signal without using an ADC, and the shared memory may be connected directly to the pixel output pulses. Embodiments described herein may use massively parallel buses between groups of pixels and the shared memory.

Though a shared ALU with a shared RAM has been discussed in some embodiments herein, the present invention is not limited thereto. According to some embodiments of the present invention, a more efficient implementation of the counter increment hardware may be incorporated as a Linear Feedback Shift Register (LFSR). Such an embodiment may replace and/or augment a shared RAM implementation. An LFSR embodiment as described herein may utilize a shift operation for bits 1 to M−1 and a logic operation on the current bits to create bit 0. In some embodiments, this will involve an exclusive-OR of the patterns of bits. A unique, pseudo-random $2^M-1$ length count sequence may be generated which can be decoded off-chip by a look-up table. This may reduce the hardware requirements per bit of the shared ALU by a XOR and AND gate to a single shared XOR among M bits.

Figure 20A:
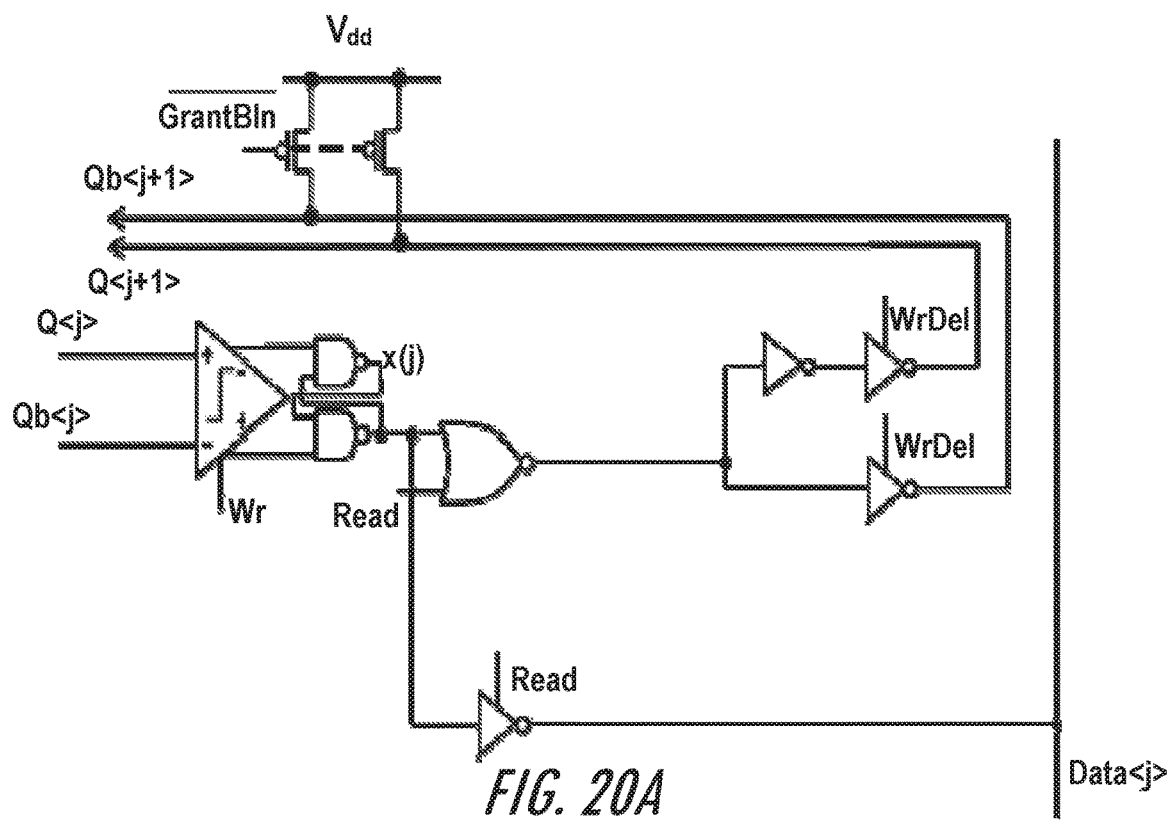
FIGS. 20A to 20C are schematic diagrams of example embodiments of an LFSR-based ALU slice, according to some embodiments described herein.
Figure 20B:
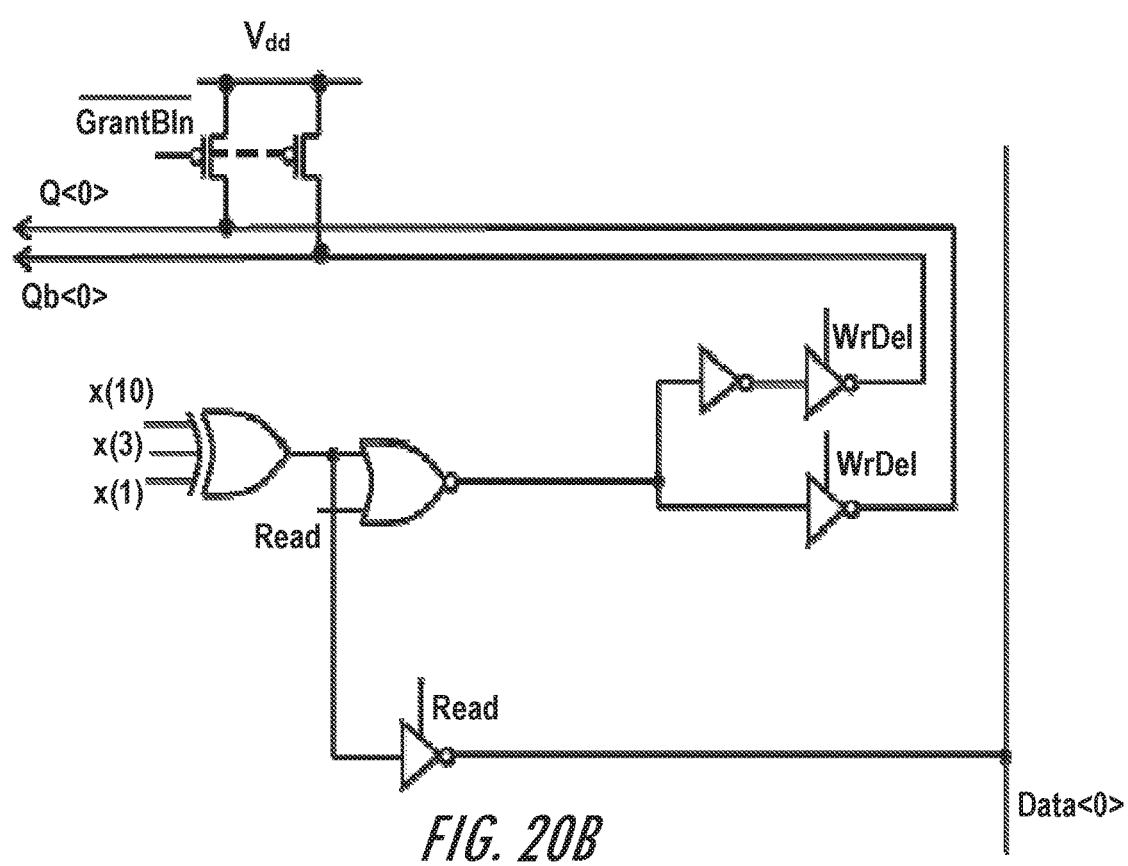

An example embodiment of an LFSR-based ALU slice (e.g., bits 1 to M−1) according to some embodiments of the present invention is illustrated in FIG. 20A. An example embodiment of an LFSR-based ALU slice for bit 0 when M=10 is illustrated in FIG. 20B. As illustrated in FIG. 20B, the half-adder circuitry has been removed from the binary increment implementation shown previously (e.g., FIG. 12) and replaced by a simple connection to implement a shift. The LFSR Polynomials for M=2-30 are illustrated below:

| M | Polynomial |
|---|---|
| 2, 3, 4, 6, 7, 15, 22 | $x^M + x + 1$ |
| 5, 11, 21, 29 | $x^M + x^2 + 1$ |
| 8, 19 | $x^M + x^6 + x^5 + x + 1$ |
| 9 | $x^M + x^4 + 1$ |
| 10, 17, 20, 25, 28 | $x^M + x^3 + 1$ |
| 12 | $x^M + x^7 + x^4 + x^3 + 1$ |
| 13, 24 | $x^M + x^4 + x^3 + x + 1$ |
| 14 | $x^M + x^{12} + x^{11} + x + 1$ |
| 16 | $x^M + x^5 + x^3 + x^2 + 1$ |
| 18 | $x^M + x^7 + 1$ |
| 23 | $x^M + x^5 + 1$ |
| 26, 27 | $x^M + x^8 + x^7 + x + 1$ |
| 30 | $x^M + x^{16} + x^{15} + x + 1$ |

According to embodiments described herein, the use of LFSR as the counter hardware may allow for a pixel without an arbiter. A LFSR counter involves relatively less complex inter stage increment logic such that everything may be fitted into a small pixel without inter-pixel sharing. In some embodiments, to reduce the need for a differential latch and drivers per bit, a 6T single ended SRAM cell may be utilized. This cell can still be laid out very densely (e.g., <0.5 µm²/bit in 40 nm CMOS). The increment logic may be a connection between pixels plus an XNOR feedback. Reset and readout may be performed through the pixel shift operation, which may need only one tri-state. The readout may re-use row-based versions of the bin-clock to address the pixel counters. The low-power time offset bin sampler may draw only capacitive power from globally distributed bin clocks and/or power at the SPAD sampling instant.

Figure 20C:
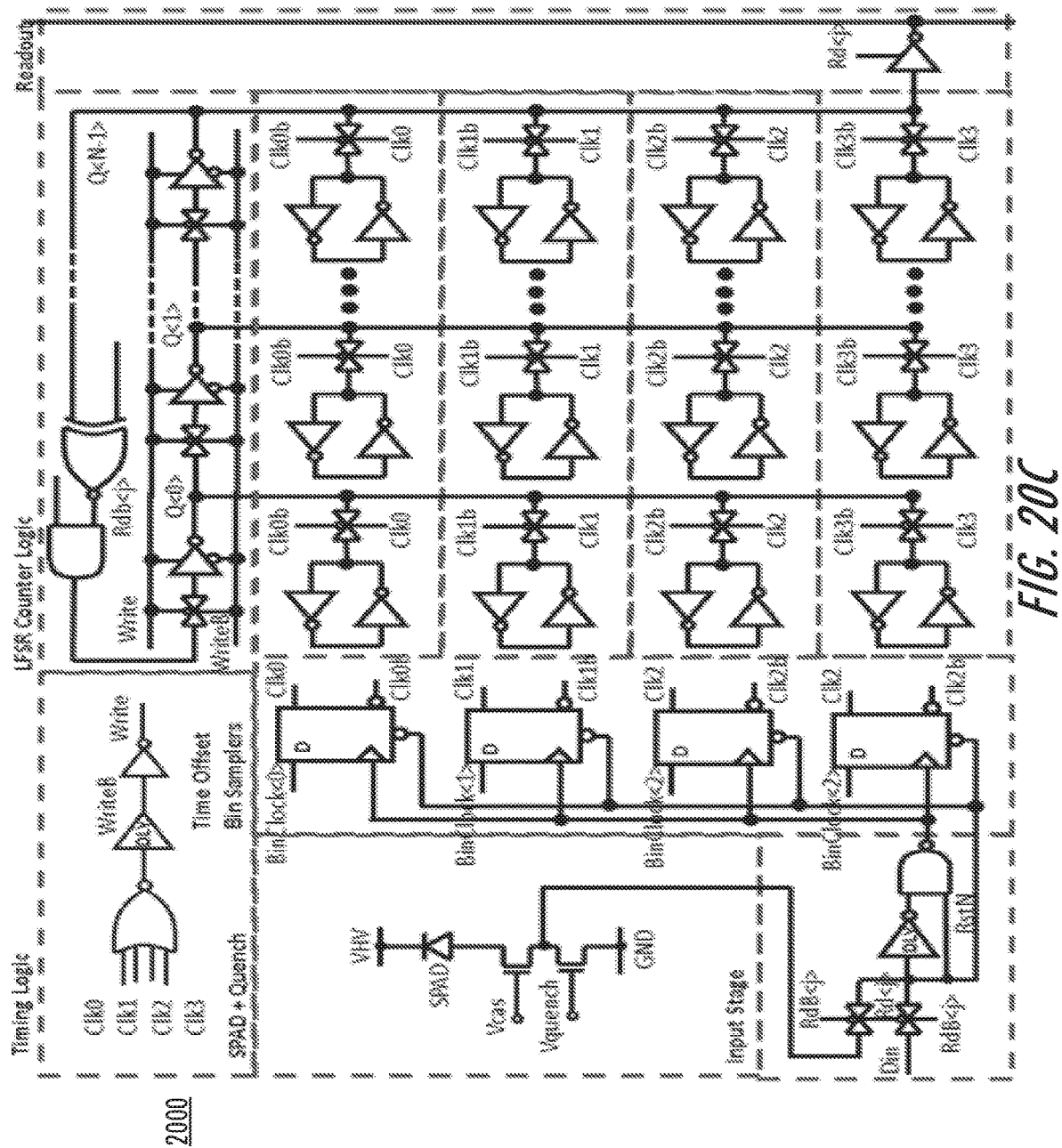

In some embodiments, a 4-bin LFSR pixel 2000 without an arbiter may be developed, an example of which is illustrated in FIG. 20C. The 4-bin LFSR pixel without an arbiter may allow 4-bin 20-bit HDR iTOF in 7 µm×7 µm area, providing a very attractive short-range (e.g., <20 m) LIDAR solution with high resolution. The pixel may be capable of operating at maximal SPAD firing rates (200 MHz) without bus collisions, and may be low power by keeping SPAD size and capacitance small. The 20-bit counting may provide bins that will not saturate even at long (e.g., 30 ms) exposure times. The pixel may be competitive with existing PD based iTOF solutions, and may be close to an optimal logic fully static implementation leveraging a high bit density cell. The embodiment illustrated in FIG. 20C may be generalizable to more bins, and thus the embodiments described herein are not limited to the bins and/or bits-per-bin in the illustrated embodiment.

Embodiments described herein provide solutions that provide an increased storage of data (e.g., bin capacities) while maintaining a reduced physical space of the device.

Another possibility of addressing the challenge of limiting the physical space associated with the memory storage in a ToF system may utilize a digital dynamic-range extension. In an embodiment, a background count rate may be determined by the system. The background count rate, also referred to herein as a background level, may refer to a level of ambient light that may be detected as part of the measuring environment that does not include optical signals from the emitter array. In some embodiments, the background count rate may include the dark count rate of the SPAD itself. A per-pixel background estimate can be achieved by measuring photon counts while the emitter (e.g., emitter array 115 of FIG. 1A) is not illuminating or in a strobe window where no signal is detected. In some embodiments, the background estimate may be determined by a photodiode with a similar spectral filter that measures the incident photon flux. A control circuit (e.g., control circuit 105 of FIG. 1A) may measure the number of counts per unit time per pixel to determine the background estimate per pixel and record it in memory, either globally or per region of the field of view.

In an embodiment, when the detector array (e.g., detector array 110 of FIG. 1A) and/or the control circuit determines that a bin value must be incremented, such as in response to detection of an incident photon, a digital comparator may compare the number of counts stored in that bin's memory to a threshold count number. As discussed herein, the location of the bin for which the count is to be stored may be selected by a bin sampling circuit.

In an embodiment, the threshold count number may correspond to the background level that was previously determined. In an embodiment, the threshold count number may correspond to one less than the background level. In an embodiment, the threshold count number may correspond to the bin memory capacity. In an embodiment, the threshold count number may correspond to one less than the bin memory capacity. In an embodiment, the threshold count number may correspond to one half of the bin capacity. In an embodiment, the threshold count number may correspond to a saturation level of digital conversion circuit (e.g., an ADC) of the pixel and/or TOF system.

If the control circuit determines that the threshold count number has been reached for a particular bin, then a counter may be incremented and the bin value may be reset to zero. In some embodiments, a separate counter may be maintained for each of the bin locations in memory. At the end of an acquisition period, both the memory value stored in the bin and the counter value are read out.

If the threshold was a function of the background then the bin value may approximate the signal level (plus or minus a Poisson noise associated with the background). For example, in an embodiment where the bin is reset at an ambient level, the photon counts for the pixel may be calculated as the bin contents plus the ambient level in response to the threshold flag being set, or the bin contents alone if the flag has not been set.

If the threshold value was a function of the bin capacity then an ALU may add the bin value to the counter value times the bin capacity. For example, the bin reset may occur at a certain fraction of the full well depth or of the ADC saturation level, which may allow for increased dynamic range of the system.

In another embodiment, a threshold flag is initially set at zero. A digital comparator (e.g., the control circuit 105 of FIG. 1A) may check whether the number of counts stored at any given moment within the bins associated with a given frame have reached the threshold level. If so, then the threshold flag may be to 1 (e.g., by the control circuit) and the number of counts in the bins may be set to zero, allowing additional counts to increment the counter. At the end of the frame, all bins whose threshold flag is set to zero are emptied and their content is read out as zero.

It will be understood that other values and comparison techniques are possible without deviating from the present invention. By utilizing the dynamic range extension described herein, higher data counts may be collected while reducing the amount of memory required.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of embodiments of the present invention being set forth in the following claims.

The invention claimed is:

1. A Time of Flight (TOF) system, comprising:
    an incrementing circuit; and
    a plurality of pixels, each pixel comprising:
        a plurality of detectors configured to output respective detection signals responsive to detection of a plurality of photons incident thereon; and
        a shared memory configured to store a respective count of the photons incident on each of the plurality of detectors,
    wherein the incrementing circuit is configured to update the respective count for each of the plurality of detectors in the shared memory based on the respective detection signals,
    wherein the shared memory comprises a plurality of bins, and
    wherein a subset of the plurality of bins is associated with a first detector of the plurality of detectors, and each bin of the subset is configured to store the respective count of the photons incident on the first detector during a time period.

2. The TOF system of claim 1, further comprising a bin sampling circuit configured to select a first bin from among the subset of the plurality of bins into which the respective count of the photons incident on the first detector is stored.

3. The TOF system of claim 2, wherein the bin sampling circuit is further configured to be activated responsive to detection of the photons by the first detector.

4. The TOF system of claim 2, wherein the bin sampling circuit is further configured to be held in reset by the first detector prior to the first detector detecting the photons.

5. The TOF system of claim 2, wherein respective ones of the plurality of pixels further comprise a bus arbiter that controls access to the shared memory by the plurality of detectors of the pixel.

6. The TOF system of claim 5, wherein the bus arbiter is configured to receive a plurality of requests from multiple ones of the plurality of detectors for access to the shared memory and, responsive thereto, select one detector of the plurality of detectors to be given access to the shared memory.

7. The TOF system of claim 1, wherein the incrementing circuit is further configured to update the respective count for each of the plurality of detectors in the shared memory responsive to the respective detection signals output by one or more of the plurality of detectors.

8. The TOF system of claim 1, wherein the incrementing circuit is an arithmetic logic unit (ALU) that is shared among the plurality of pixels.

9. The TOF system of claim 8, wherein the ALU is configured to perform a read-increment-write operation on the shared memory of each of the pixels.

10. The TOF system of claim 1, wherein at least one of the plurality of detectors is a Single Photon Avalanche Diode (SPAD).

11. The TOF system of claim 1, wherein the incrementing circuit is further configured to update the respective count for each of the plurality of detectors for each of the plurality of pixels.

12. The TOF system of claim 1, wherein at least one of the pixels has an area of less than 10 µm by 10 µm.

13. The TOF system of claim 1, wherein at least one of the pixels has an area of less than 3 µm by 3 µm.

14. The TOF system of claim 1, wherein the pixel has a full-well depth of at least 10000 photons.

15. The TOF system of claim 1, wherein the shared memory is a static random access memory (SRAM) or a dynamic random access memory (DRAM).

16. The TOF system of claim 1, wherein the incrementing circuit comprises a Linear Feedback Shift Register (LFSR).

17. The TOF system of claim 1, wherein the TOF system comprises a plurality of tiers,
wherein a first tier of the plurality of tiers comprises the detectors; and
wherein a second tier of the plurality of tiers comprises the shared memory.

18. The TOF system of claim 1, wherein the incrementing circuit is further configured to update the respective count for each of the plurality of detectors responsive to comparison to a threshold value.

19. The TOF system of claim 18, wherein the threshold value is based on a background level of light associated with a field of view of the ToF system or a capacity of the shared memory.

20. The TOF system of claim 18, wherein the incrementing circuit is further configured to associate a respective counter with each bin of the subset of the plurality of bins and to update the counter based on whether the respective count of the photons incident on the first detector during the time period exceeds the threshold value.

21. A Time of Flight (TOF) system, comprising:
an incrementing circuit; and
a plurality of pixels, each pixel comprising:
a plurality of detectors configured to output respective detection signals responsive to detection of a plurality of photons incident thereon;
a shared memory comprising a plurality of bins, each bin configured to store a respective count of photons incident on one of the plurality of detectors during a respective time period; and
a bin sampling circuit configured to select a first bin from among the plurality of bins into which the respective count of the photons incident on a first detector of the plurality of detectors is stored,
wherein the incrementing circuit is configured to update the respective count of the photons incident on the first detector in the shared memory at the first bin in the shared memory indicated by the bin sampling circuit.

22. The TOF system of claim 21, wherein the bin sampling circuit is further configured to be activated responsive to detection of the photons by the first detector.

23. The TOF system of claim 21, wherein the bin sampling circuit is further configured to be held in reset by the first detector prior to detection of the photons by the first detector.

24. The TOF system of claim 21, wherein respective ones of the plurality of pixels further comprise a bus arbiter that controls access to the shared memory by the plurality of detectors of the pixel.

25. The TOF system of claim 24, wherein the bus arbiter is configured to receive a plurality of requests from multiple ones of the plurality of detectors for access to the shared memory and, responsive thereto, select one detector of the plurality of detectors to be given access to the shared memory.

26. The TOF system of claim 21, wherein the incrementing circuit is further configured to update the respective count for the first detector responsive to comparison to a threshold value.

27. The TOF system of claim 26, wherein the threshold value is based on a background level of light associated with a field of view of the ToF system, a capacity of the shared memory, and/or a saturation level of digital conversion circuitry associated with the TOF system.

28. The TOF system of claim 26, wherein a subset of the plurality of bins are associated with the first detector, and
wherein the incrementing circuit is further configured to associate a respective counter with each bin of the subset of the plurality of bins and to update the counter based on whether the respective count of the photons incident on the first detector during the time period exceeds the threshold value.

29. A Time of Flight (TOF) system, comprising:
an incrementing circuit; and
a plurality of pixels, each pixel comprising:
a plurality of detectors configured to output respective detection signals responsive to detection of a plurality of photons incident thereon; and
a shared memory configured to store a respective count of the photons incident on each of the plurality of detectors,
wherein the incrementing circuit is configured to update the respective count for each of the plurality of detectors in the shared memory based on a comparison of the respective count to a threshold value,
wherein the shared memory comprises a plurality of bins, and
wherein a subset of the plurality of bins is associated with a first detector of the plurality of detectors, each bin of the subset configured to store the respective count of the photons incident on the first detector during a time period.

30. The TOF system of claim 29, wherein the threshold value is based on a background level of light associated with a field of view of the ToF system, a capacity of the shared memory, and/or a saturation level of digital conversion circuitry associated with the TOF system.

31. The TOF system of claim 30, wherein the incrementing circuit is further configured to associate a respective counter with each bin of the subset of the plurality of bins and to update the counter based on whether the respective count of the photons incident on the first detector during the time period exceeds the threshold value.

32. The TOF system of claim 30, further comprising a bin sampling circuit configured to select a first bin from among the subset of the plurality of bins into which the respective count of the photons incident on the first detector is stored.

33. The TOF system of claim 32, wherein the bin sampling circuit is further configured to be activated responsive to detection of the photons by the first detector.

34. The TOF system of claim 32, wherein the bin sampling circuit is further configured to be held in reset by the first detector prior to the first detector detecting the photons.

35. The TOF system of claim 30, wherein respective ones of the plurality of pixels further comprise a bus arbiter that controls access to the shared memory by the plurality of detectors of the pixel.

36. The TOF system of claim 35, wherein the bus arbiter is configured to receive a plurality of requests from multiple ones of the plurality of detectors for access to the shared memory and, responsive thereto, select one detector of the plurality of detectors to be given access to the shared memory.

* * * * *